(12) United States Patent
Zaehring

(10) Patent No.: US 10,994,864 B1
(45) Date of Patent: *May 4, 2021

(54) SYSTEM AND METHOD FOR DATA TRANSFER VIA A DISPLAY DEVICE INCLUDING A BEZEL LIGHT SENSOR

(71) Applicant: Rockwell Collins, Inc., Cedar Rapids, IA (US)

(72) Inventor: James M. Zaehring, Edmonds, WA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/793,388

(22) Filed: Feb. 18, 2020

Related U.S. Application Data

(63) Continuation of application No. 16/056,036, filed on Aug. 6, 2018, now Pat. No. 10,604,274.

(51) Int. Cl.
| | |
|---|---|
| *B64D 47/02* | (2006.01) |
| *G06F 11/07* | (2006.01) |
| *G06F 3/0488* | (2013.01) |
| *G06F 1/16* | (2006.01) |
| *B64F 5/60* | (2017.01) |

(52) U.S. Cl.
CPC ............ *B64D 47/02* (2013.01); *B64F 5/60* (2017.01); *G06F 1/1601* (2013.01); *G06F 3/0488* (2013.01); *G06F 11/0739* (2013.01)

(58) Field of Classification Search
CPC ......... B64D 47/02; B64F 5/60; G06F 3/0488; G06F 11/0739; G06F 1/1601
See application file for complete search history.

(56) References Cited

U.S. PATENT DOCUMENTS

| | | | |
|---|---|---|---|
| 10,108,889 B1 | 10/2018 | Zaehring et al. | |
| 10,425,461 B1 | 9/2019 | Zaehring | |
| 2015/0146925 A1* | 5/2015 | Son | G06F 3/017 382/103 |
| 2015/0205993 A1* | 7/2015 | Han | G06K 9/00013 345/173 |
| 2016/0005229 A1* | 1/2016 | Lee | G06F 3/0488 345/419 |
| 2016/0163018 A1* | 6/2016 | Wang | G06T 1/20 345/504 |
| 2018/0103341 A1* | 4/2018 | Moiyallah, Jr. | G06F 3/04842 |
| 2018/0276473 A1* | 9/2018 | Kim | G06F 16/434 |
| 2019/0033888 A1* | 1/2019 | Bosworth | G06K 9/209 |

* cited by examiner

*Primary Examiner* — Andrew Sasinowski
(74) *Attorney, Agent, or Firm* — Suiter Swantz pc llo

(57) ABSTRACT

A display system may include a display device and a controller. The display device may include a bezel with a bezel light sensor and a screen set within the bezel. The controller may be configured to receive a flashing light signal via the bezel light sensor, generate a response to a set of coded information in the flashing light signal, and provide the response to the set of coded information via the screen. The flashing light signal may be transmitted by a light generator of an electronic device. A filter may be couplable to at least one of the electronic device at a position proximate to the light generator or the display device at a position proximate to the bezel light sensor. A wavelength of the flashing light signal may be a first wavelength. The filter may be configured to convert the first wavelength to a second wavelength.

20 Claims, 14 Drawing Sheets

SYSTEM AND METHOD FOR DATA TRANSFER VIA A DISPLAY DEVICE INCLUDING A BEZEL LIGHT SENSOR

CROSS-REFERENCE TO RELATED APPLICATIONS

The present application is a continuation of U.S. patent application Ser. No. 16/056,036, filed Aug. 6, 2018, titled SYSTEM AND METHOD FOR DATA TRANSFER VIA A DISPLAY DEVICE INCLUDING A BEZEL LIGHT SENSOR, naming James M. Zaehring as inventor, incorporated herein by reference in the entirety.

BACKGROUND OF THE INVENTION

Operational errors are typically difficult to reproduce during testing, production, and/or field maintenance of avionics systems due to a limited availability of data and a difficulty in correlating data to a display event. Known troubleshooting methods such as PEEK or POKE, where specific memory regions and/or memory addresses are provided upon request, require bi-directional communication and special factory diagnostic modes. In avionics systems, PEEK capabilities may be impractical due to interface accessibility, and factory diagnostic modes may be impractical due to control limitations on production aircraft.

Bi-directional communication in avionics systems typically requires customized instrument buses (e.g., specific test equipment with customized wired inputs). The customized instrument buses may include complicated configurations, interfaces, functions, and/or faults. In addition, the instrument buses may be required to conform with select standard protocols (e.g., Ethernet, ARINC 429, ARINC 615A, ARINC 661, or the like). Further, the customized instrument buses may be limited by constraints imposed upon by original equipment manufacturers (OEMs) and/or component purchasers (e.g., airlines, or the like). Further, the customized instrument buses may require an advanced level of knowledge of relevant systems to configure the connections between customized instrument buses and an aircraft.

These configurations, interfaces, functions, faults, and/or standard protocols must be fully realized and completely defined during development. As such, production of the customized instrument buses may require considerable amounts of time, funds, paperwork, and coordination between involved parties during design, testing, and certification phases.

Therefore, it would be advantageous to provide a system and method that cures the shortcomings described above.

SUMMARY

In one aspect, embodiments of the inventive concepts disclosed herein are directed to an avionics display system. The avionics display system may include a display device. The display device may include a bezel. The bezel may include a bezel light sensor. The display device may include a screen set within the bezel. The avionics display system may include a controller coupled to the bezel light sensor. The controller may be configured to receive a flashing light signal via the bezel light sensor. The flashing light signal may include a set of coded information. The flashing light signal may be transmitted by a light generator of an electronic device. A filter may be couplable to at least one of the electronic device at a position proximate to the light generator or the display device at a position proximate to the bezel light sensor. The wavelength of the flashing light signal may be a first wavelength. The filter may be configured to convert the first wavelength to a second wavelength. The controller may be configured to generate a response to the set of coded information. The controller may be configured to provide the response to the set of coded information via the screen.

In a further aspect, embodiments of the inventive concepts disclosed herein are directed to a method. The method may include receiving a flashing light signal via a bezel light sensor in a bezel of a display device. The flashing light signal may include a set of coded information. The flashing light signal may be transmitted by a light generator of an electronic device. A filter may be couplable to at least one of the electronic device at a position proximate to the light generator or the display device at a position proximate to the bezel light sensor. The wavelength of the flashing light signal may be a first wavelength. The filter may be configured to convert the first wavelength to a second wavelength. The method may include generating a response to the set of coded information. The method may include providing the response via a screen set within the bezel of the display device.

In a further aspect, embodiments of the inventive concepts disclosed herein are directed to a system. The system may include a display device. The display device may include a bezel. The bezel may include a bezel light sensor. The display device may include a screen set within the bezel. The system may include a controller coupled to the bezel light sensor. The controller may be configured to receive a flashing light signal via the bezel light sensor. The flashing light signal may include a set of coded information. The controller may be configured to generate a response to the set of coded information. The controller may be configured to provide the response to the set of coded information via the screen. The system may include an electronic device. The electronic device may include an imaging device configured to acquire one or more images. The personal electronic device may include a light generator configured to generate the flashing light signal. The flashing light signal may include a wavelength. The electronic device may include a user controller. The user controller may be configured to transmit the set of coded information via the flashing light signal generated by the light generator. The user controller may be configured to acquire the response to the set of coded information from the screen via the imaging device. The system may include a filter. The filter may be couplable to at least one of the electronic device at a position proximate to the light generator or the display device at a position proximate to the bezel light sensor. The wavelength of the flashing light signal may be a first wavelength. The filter may be configured to convert the first wavelength to a second wavelength.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
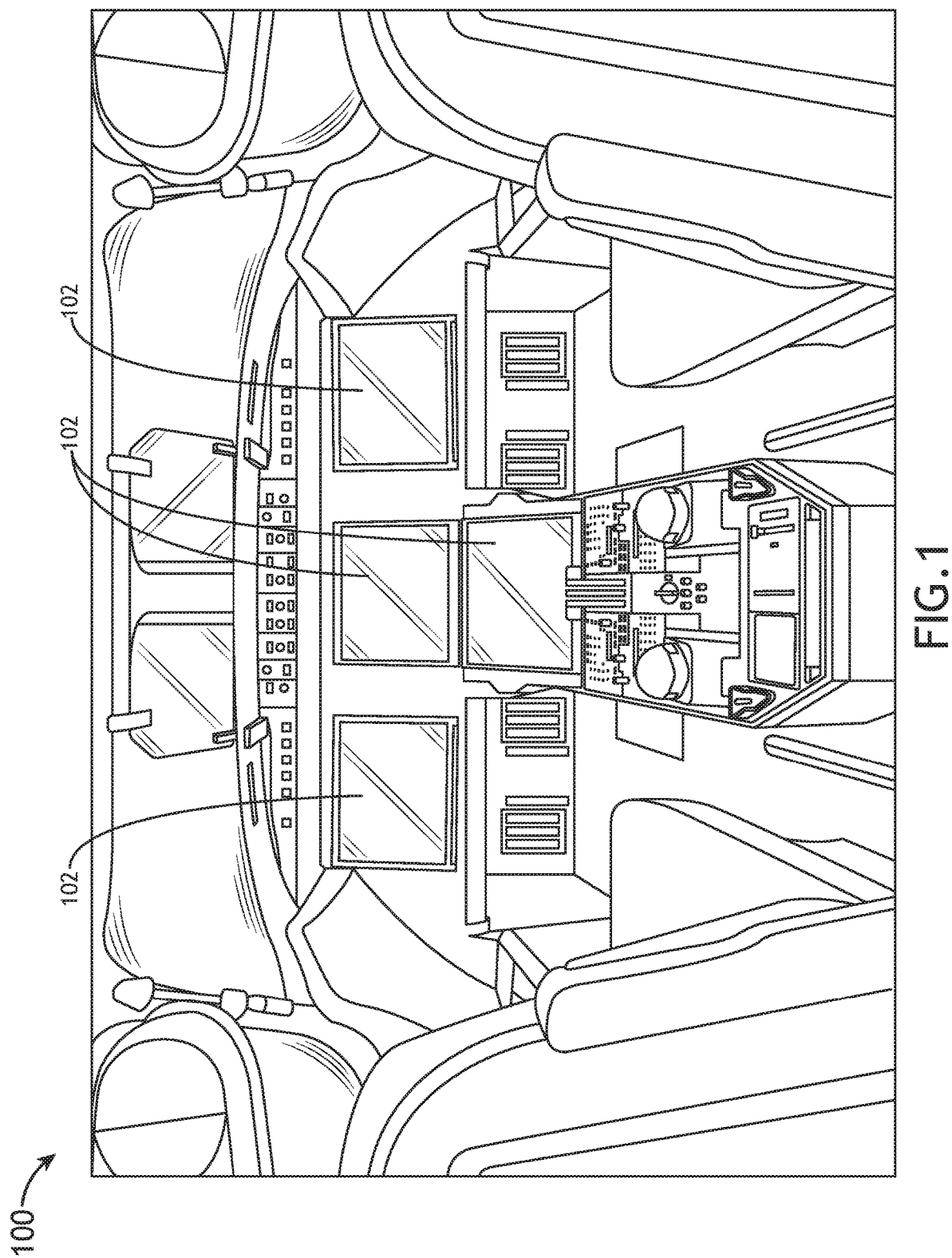
FIG. 1 is an example embodiment of an avionics environment in which a system and method for data transfer via a display device including a bezel light sensor may be implemented, in accordance with the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

FIGS. 1-14 generally illustrate exemplary embodiments of a system and method for data transfer via a display device including a bezel light sensor in accordance with the inventive concepts disclosed herein.

Broadly, embodiments of the inventive concepts disclosed herein are directed to a system and method for data transfer via a display device including a bezel light sensor. More particularly, embodiments of the inventive concepts disclosed herein are directed to a system and method for data transfer via a display device including a bezel light sensor, where data is transmitted to and/or acquired from the display device including the bezel light sensor.

Figure 2:
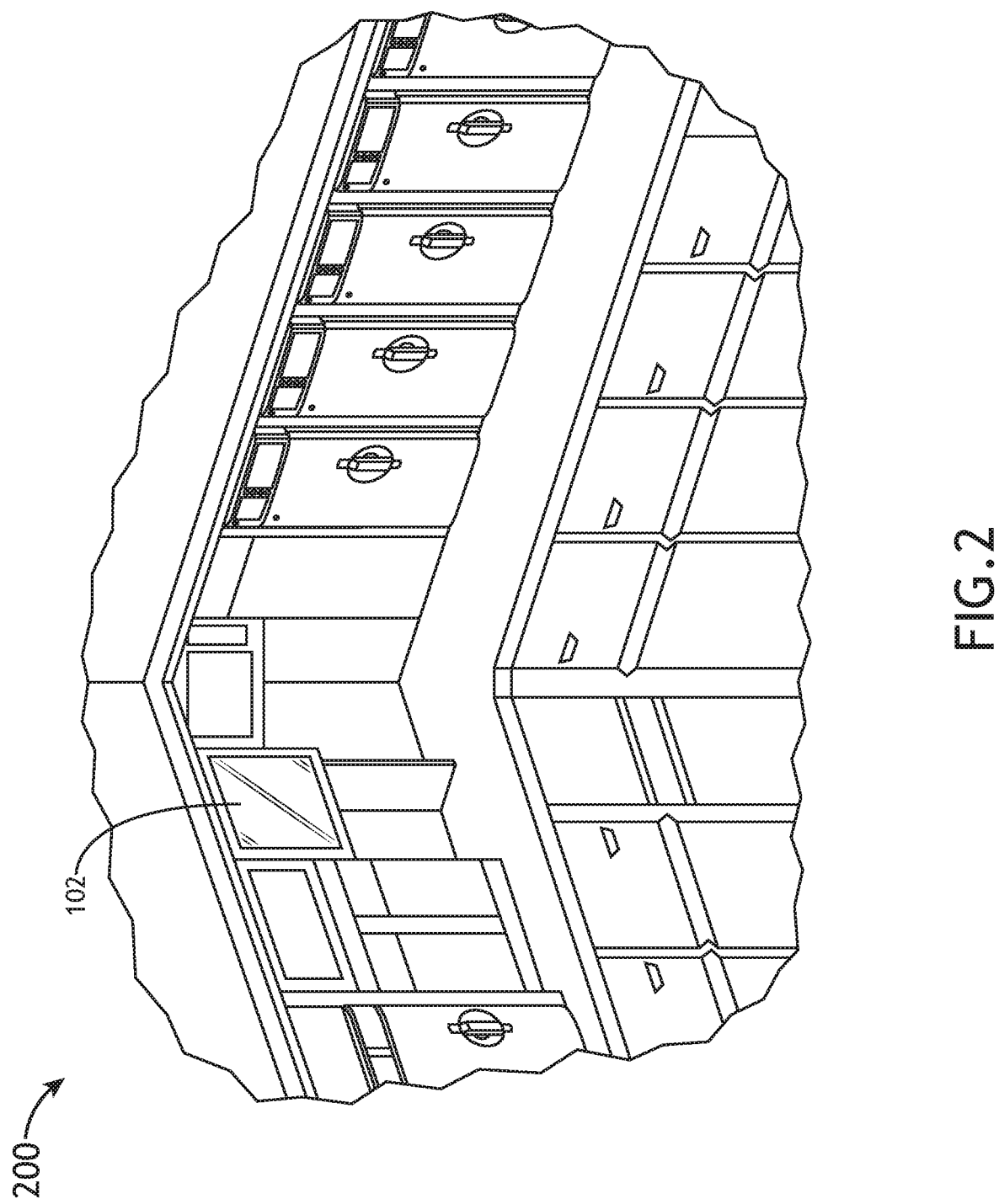
FIG. 2 is an example embodiment of an avionics environment in which a system and method for data transfer via a display device including a bezel light sensor may be implemented, in accordance with the inventive concepts disclosed herein.
Figure 3:
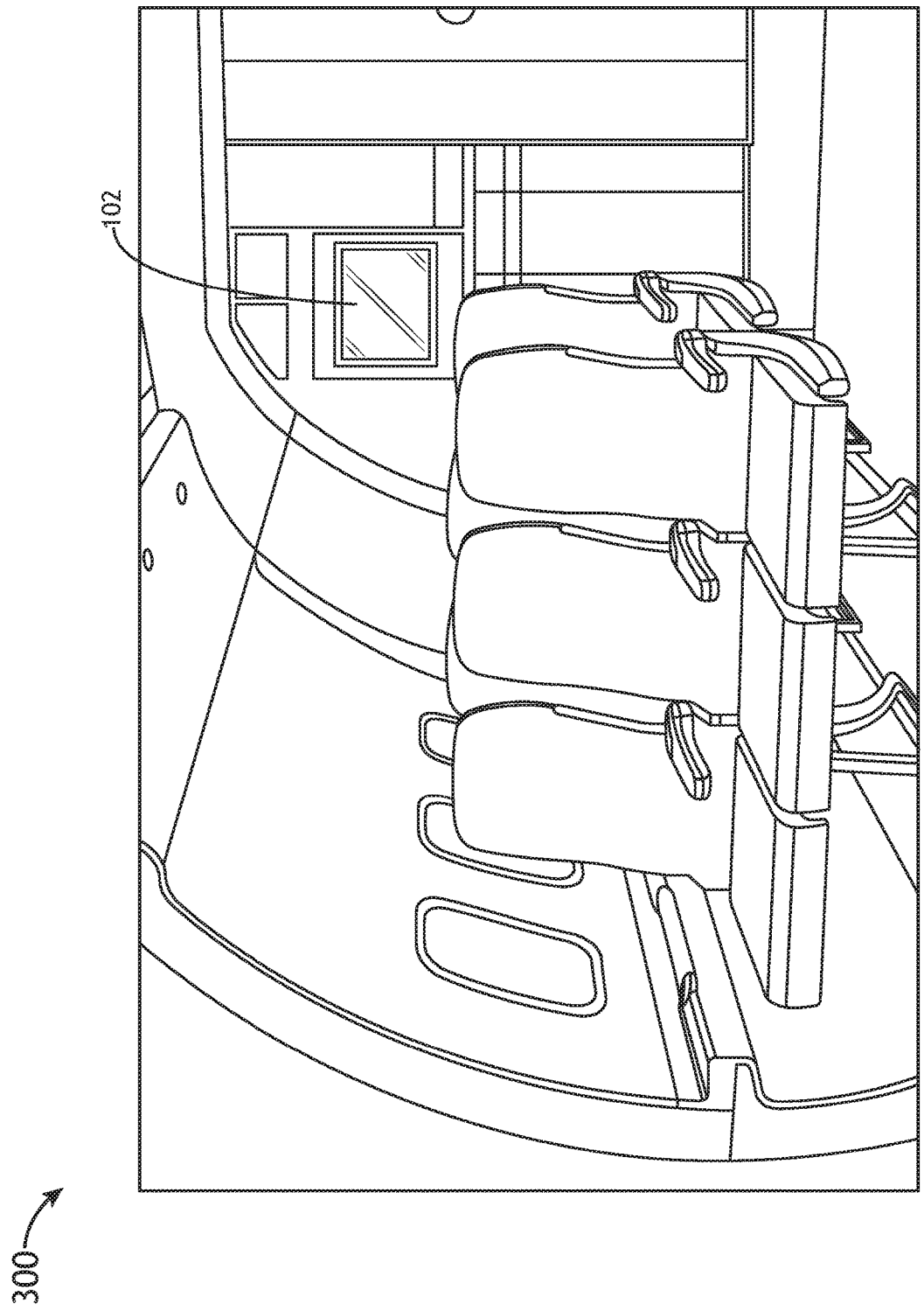
FIG. 3 is an example embodiment of an avionics environment in which a system and method for data transfer via a display device including a bezel light sensor may be implemented, in accordance with the inventive concepts disclosed herein.

FIGS. 1-3 generally illustrate example embodiments of an avionics environment in which a system and method for data transfer via a display device including a bezel light sensor may be implemented, in accordance with the inventive concepts disclosed herein. For example, as illustrated in FIG. 1, the avionics environment may include a cockpit 100 of an aircraft. By way of another example, as illustrated in FIG. 2, the avionics environment may include a galley 200 of an aircraft. By way of another example, as illustrated in FIG. 3, the avionics environment may include a cabin 300 of an aircraft.

The avionics environment (e.g., the cockpit 100, the galley 200, the cabin 300, or the like) may include one or more display devices 102. For example, the one or more display devices 102 may be employed to present electronic maps, aircraft performance parameters, aircraft performance parameter predictions, sensor readings, aircraft data, flight data, communications, alerts, and the like. For instance, the one or more display devices 102 may include, but are not limited to, one or more primary flight displays and/or one or more multi-function displays that are viewable by a flight crew member (e.g., pilot, co-pilot, or other on-board crew). It is noted herein, however, that the avionics environment (e.g., the cockpit 100, the galley 200, the cabin 300, or the like) may include any number of display devices 102 (e.g., one, two, three, or more displays) including one or more primary flight displays, secondary flight displays, and/or multi-function displays.

Where the environment includes an avionics environment, it is noted herein the system and method for data transfer via a display device including a bezel light sensor may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although example embodiments of the present disclosure are directed to an avionics environment, it is noted herein the system and method for data transfer via a display device including a bezel light sensor may be configured to operate in any type of vehicle known in the art. For example, the vehicle may be any air, land, or water-based personal equipment or vehicle; any air, land, or water-based commercial equipment or vehicle; any air, land, or water-based military equipment or vehicle known in the art. For instance, an automobile may include a display device 102. Therefore, the above description should not be interpreted as a limitation on the present disclosure but merely an illustration.

Although example embodiments of the present disclosure are directed to a vehicle including one or more display devices with a bezel light sensor, it is noted herein the system and method for data transfer via a display device including a bezel light sensor may be coupled to and/or configured to operate with any type of display device including a bezel light sensor known in the art.

Figure 4:
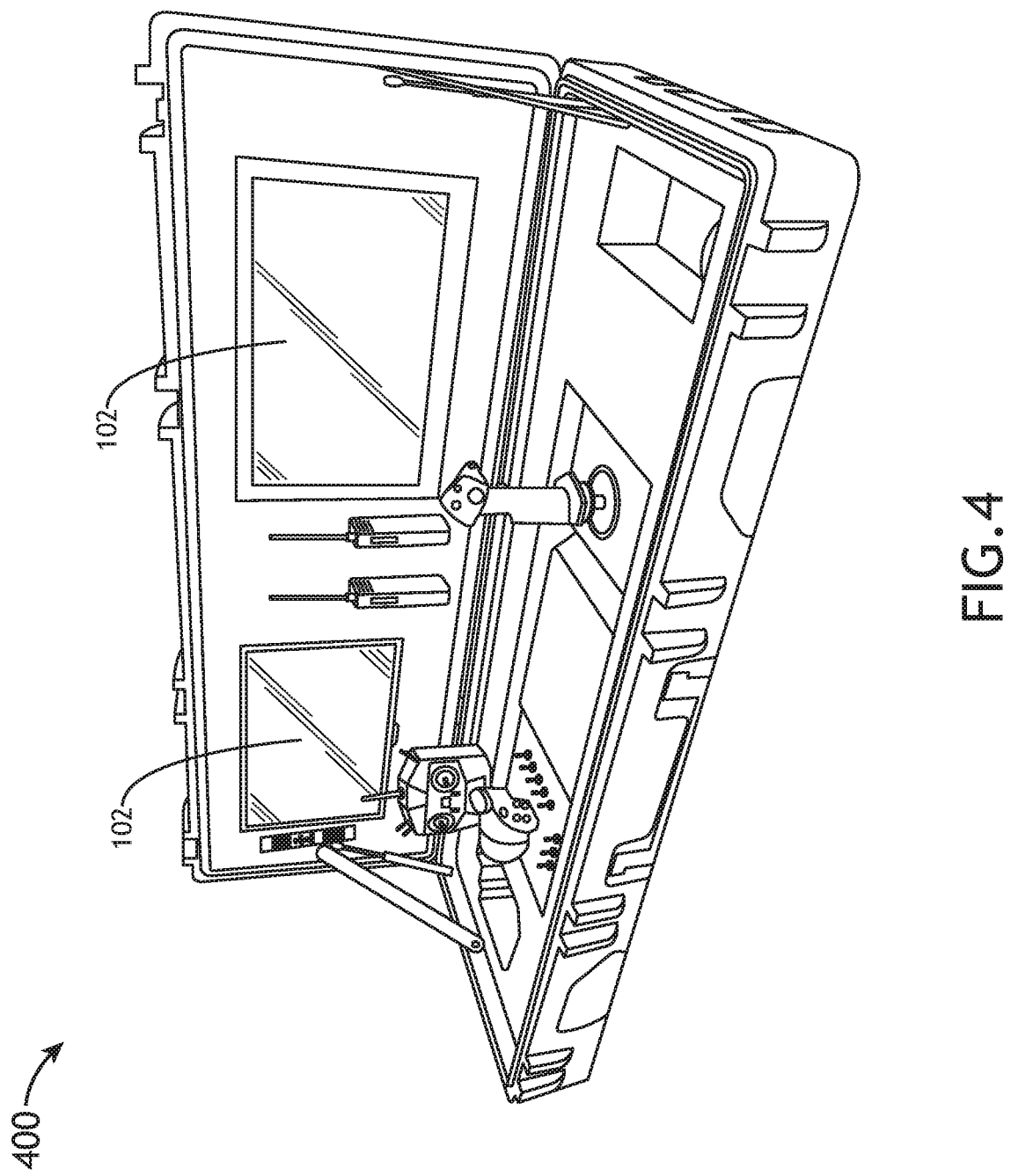
FIG. 4 is an example embodiment of an unmanned aerial vehicle (UAV) control station in which a system and method for data transfer via a display device including a bezel light sensor may be implemented, in accordance with the inventive concepts disclosed herein.
Figure 5:
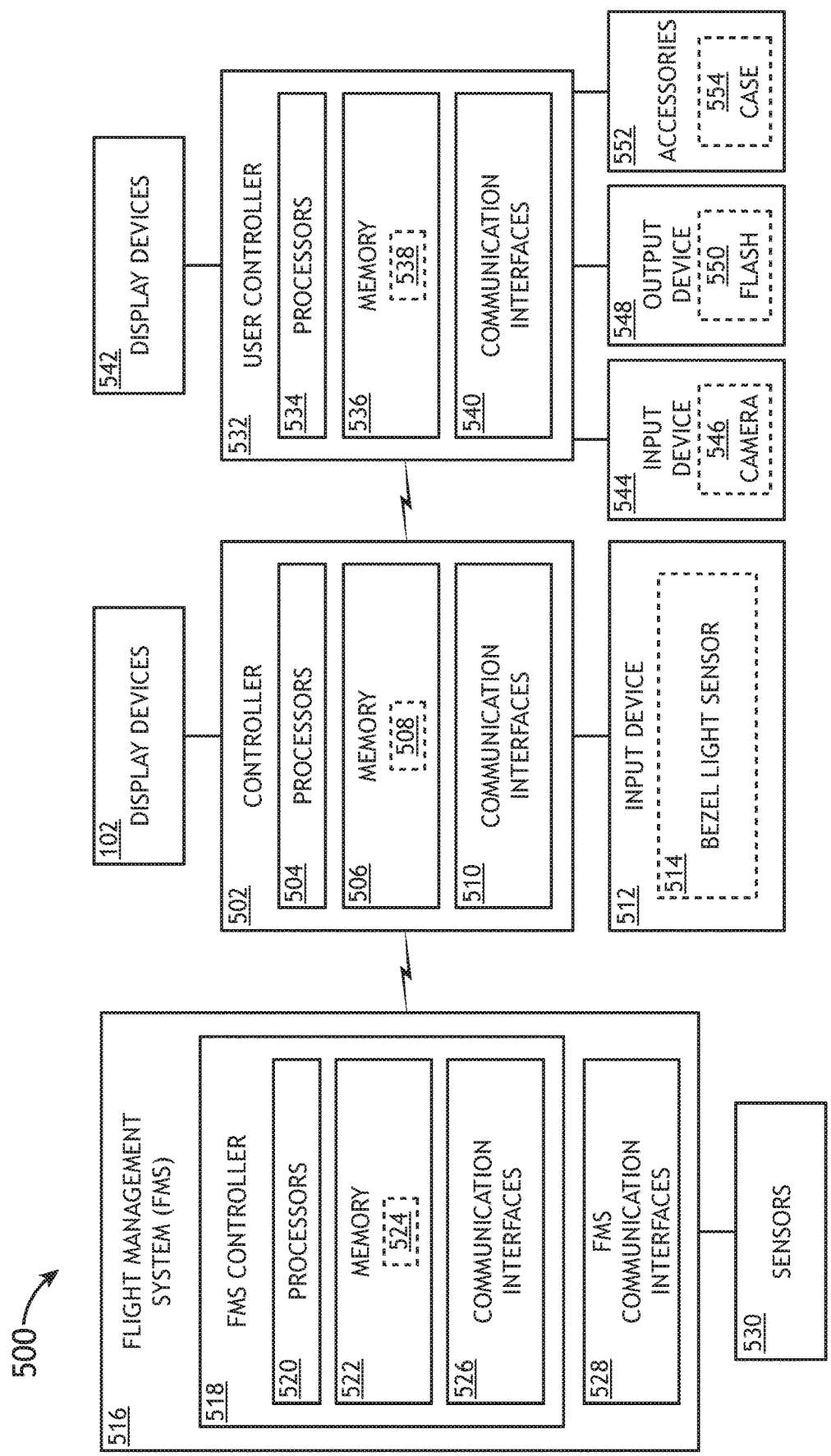
FIG. 5 is an example embodiment of a system for data transfer via a display device including a bezel light sensor, in accordance with the inventive concepts disclosed herein.

For example, the system and method for data transfer via a display device including a bezel light sensor may be implemented by one or more unmanned aerial vehicle (UAV) control stations 400, as illustrated in FIG. 4. The UAV control station 400 may include the one or more display devices 102. The UAV control station 400 may be a standalone portable device (e.g., as illustrated in FIG. 4). It is noted herein, however, that the UAV control station 400 may be housed within and/or coupled to a facility or a moving vehicle (e.g., van, truck, boat, other aircraft, or the like). In addition, it is noted herein the UAV control station 400 may be subject to the avionics guidelines and/or standards as set forth above.

By way of another example, the system and method for data transfer via a display device including a bezel light sensor may be coupled to and/or configured to operate with any type of display device including a bezel light sensor known in the art, where the display device is sold for commercial or industrial use in either a home or a business. For example, a general-purpose computer or other consumer electronic device may include a display device 102 including a bezel light sensor. Therefore, the above description should not be interpreted as a limitation on the present disclosure but merely an illustration.

FIGS. 5-10 generally illustrate an embodiment of a system 500 for data transfer via a display device including a bezel light sensor, in accordance with the inventive concepts disclosed herein.

The system 500 may include a controller 502. The controller 502 may include one or more processors 504 and memory 506. The memory may store one or more sets of program instructions 508. The controller 502 may include one or more communication interfaces 510. The controller 502 may be coupled to one or more display devices. For example, the one or more display devices may include, but are not limited to, the one or more display devices 102. The controller 502 may be coupled to one or more input devices 512. For example, the one or more input devices 512 may include, but are not limited to, an imaging device. For instance, the imaging device may include, but is not limited to, a bezel light sensor 514 (BLS 514). It is noted herein that the controller 502 and the one or more display devices 102 may be considered an avionics display system, for purposes of the present disclosure.

The system 500 may include a flight management system (FMS) 516. The FMS 516 may include a flight management system controller 518 (FMS controller 518). THE FMS controller 518 may include one or more processors 520 and memory 522. The memory 522 may store one or more sets of program instructions 524. The FMS controller 518 may include one or more communication interfaces 526. The FMS 516 may include one or more flight management system communication interfaces 528 (FMS communication interfaces 528). The FMS 516 may be coupled to one or more sensors 530. The FMS 516 may be coupled to the controller 502.

Although embodiments of the present disclosure are directed to the controller 502 and the FMS controller 518 as separate components of the system 500, it is noted herein that the controller 502 and the FMS controller 518 may be the same component within the system 500. In addition, although embodiments of the present disclosure are directed to the one or more communication interfaces 510, the one or more communication interfaces 526, and/or the one or more FMS communication interfaces 528 as separate components of the system 500, it is noted herein the one or more communication interfaces 510, the one or more communication interfaces 526, and/or the one or more FMS communication interfaces 528 may be the same component within the system 500. In this regard, the one or more display devices 102 and/or the one or more input devices 512 may be coupled to the controller 502 and/or the FMS controller 518. Therefore, the above description should not be interpreted as a limitation on the present disclosure but merely an illustration.

The system 500 may include a user controller 532. The user controller 532 may include one or more processors 534 and memory 536. The memory 536 may store one or more sets of program instructions 538. The user controller 532 may include one or more communication interfaces 540. The user controller 532 may be coupled to one or more display devices 542.

The user controller 532 may be coupled to one or more input devices 544. For example, the one or more input devices 544 may include an imaging device configured to acquire one or more images. For instance, the imaging device may include, but is not limited to, a camera 546. The user controller 532 may be coupled to one or more output devices 548. For example, the one or more output devices 548 may include a light generator. For instance, the light generator may include, but is not limited to, a device configured to produce a light such as a camera flash 550. The user controller 532 may be coupled to one or more accessories 552. For example, the one or more accessories 522 may include, but are not limited to, a case 554.

Although embodiments of the present disclosure are directed to the one or more input devices 544 (e.g., a camera 546) and the one or more output devices 548 (e.g., a camera flash 550) being coupled to the user controller 532, it is noted herein that the input device 544 and/or the output device 548 may be standalone components from the user controller 532.

The controller 502, the FMS controller 518, and/or the user controller 532 may be a computer including, but not limited to, a desktop computer, a mainframe computer system, a workstation, an image computer, a parallel processor, a networked computer, or the like. The controller 502, the FMS controller 518, and/or the user controller 532 may be a personal electronic device. For example, the personal electronic device may include a handheld computer such as, but not limited to, a smartphone, a tablet, a phablet, or the like. By way of another example, the personal electronic device may include a laptop computer such as, but not limited to, a laptop with a single-fold hinge, a laptop with a double-fold hinge, a laptop with a twist-and-fold hinge, a laptop with a detachable display device and/or a detachable user input device, or the like.

The one or more processors 504, 520, 534 may include any one or more processing elements known in the art. In this sense, the one or more processors 504, 520, 534 may include any microprocessor device configured to execute algorithms and/or program instructions. In general, the term "processor" may be broadly defined to encompass any device having one or more processing elements, which execute a set of program instructions from a non-transitory memory medium (e.g., the memory 506, 522, 536), where the one or more sets of program instructions 508, 524, 538 is configured to cause the one or more processors 504, 520, 534 to carry out any of one or more process steps.

The memory 506, 522, 536 may include any storage medium known in the art suitable for storing the one or more sets of program instructions 508, 524, 538 executable by the associated one or more processors 504, 520, 534. For example, the memory 506, 522, 536 may include a non-transitory memory medium. For instance, the memory 506, 522, 536 may include, but is not limited to, a read-only memory (ROM), a random access memory (RAM), a magnetic or optical memory device (e.g., disk), a magnetic tape, a solid state drive, and the like. The memory 506, 522, 536 may be configured to provide display information to the display device (e.g., display devices 102, 542). In addition, the memory 506, 522, 536 may be configured to store user input information from a user input device (e.g., input devices 512, 544). The memory 506, 522, 536 may be housed in a common controller housing with the one or more processors 504, 520, 534. The memory 506, 522, 536 may, alternatively or in addition, be located remotely with respect to the spatial location of the processors 504, 520, 534 and/or the controller 502, 518, 532. For instance, the one or more processors 504, 520, 534 and/or the controller 502, 518, 532 may access a remote memory 506, 522, 536 (e.g., server), accessible through a network (e.g., internet, intranet, and the like) via the one or more communication interfaces 510, 526, 528, 540.

The controller 502, 518, 532 may be configured to receive and/or acquire data or information from other systems or tools via the one or more communication interfaces 510, 526, 528, 540 that may include wireline and/or wireless portions. In addition, the controller 502, 518, 532 may be configured to transmit data or information (e.g., the output of one or more procedures of the inventive concepts disclosed herein) to one or more systems or tools via the one or more communication interfaces 510, 526, 528, 540 that may include wireline and/or wireless portions. In this regard, the transmission medium may serve as a data link between the controllers 502, 518, 532 and other subsystems. In addition, the controllers 502, 518, 532 may be configured to send data to external systems via a transmission medium (e.g., network connection).

The one or more display devices 102, 542 may include any display device known in the art. For example, the one or more display devices 102, 542 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more input devices 512, 544 may include any user input device known in the art. For example, the one or more input devices 512, 544 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 102, 542 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices 512, 544 may include, but is not limited to, a bezel mounted interface.

Although embodiments of the present disclosure are directed to the one or more display devices 102, 542 being indirectly coupled to the corresponding one or more input devices 512, 544 indirectly (e.g., via the controller 502 or the user controller 532), it is noted herein the one or more display devices 102, 542 may be directly coupled to the corresponding one or more input devices 512, 544. For example, the one or more display devices 102, 542 may be housed with the one or more input devices 512, 544 in a common user interface housing. Therefore, the above description should not be interpreted as a limitation on the present disclosure but merely an illustration.

Figure 6:
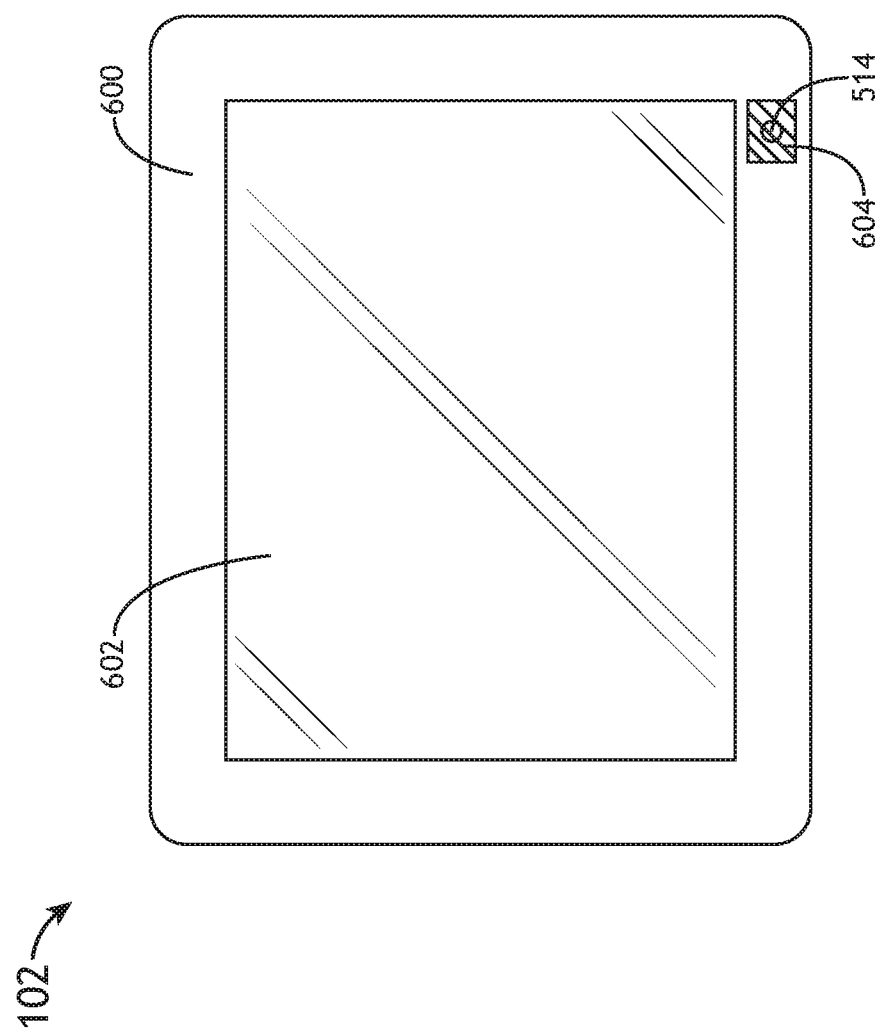
FIG. 6 is an example embodiment of a display device including a bezel light sensor, in accordance with the inventive concepts disclosed herein.

As illustrated in FIG. 6, the display device 102 coupled to the controller 502 may include a bezel 600. The bezel light sensor 514 may be attached to a surface of, or inset within, the bezel 600. A screen 602 may be set within (e.g., housed within and/or mounted to) the bezel 600. A filter 604 may be coupled to the bezel 600 of the display device 102 in a position proximate to (e.g., in front of) the bezel light sensor 514. For example, the filter 604 may be coupled directly to a surface of the bezel 600 via an adhesive, one or more fasteners, or the like. By way of another example, the filter 604 may be a component of an assembly that interacts with a mounting bracket (e.g., via an interlocking tab assembly, an adhesive, one or more fasteners, or the like), where the mounting bracket is coupled to the surface of the bezel 600.

As generally illustrated in FIGS. 7A-7C, the user controller 532 may include a smartphone or other handheld computer. The user controller 532 may include and/or be coupled to the camera 546. The user controller 532 may include and/or be coupled to the one or more output devices 548 (e.g., the camera flash 550) configured to operate in conjunction with and/or independently of the one or more input devices (e.g., the camera 546). A filter 604 may be coupled to the user controller 532 in a position proximate to (e.g., in front of) the one or more output devices 548.

As illustrated in FIG. 7A, the filter 604 may be coupled to a surface 700 of the user controller 532 in a position proximate to (e.g., in front of) the camera flash 550 such that the filter 604 at least partially covers the camera flash 550. For example, the filter 604 may be coupled directly to the surface 700 of the user controller 532 via an adhesive, one or more fasteners, or the like. By way of another example, the filter 604 may be a component of an assembly that interacts with a mounting bracket (e.g., via an interlocking tab assembly, an adhesive, one or more fasteners, or the like), where the mounting bracket is coupled to the surface 700 of the user controller 532.

As illustrated in FIG. 7B, the user controller 532 may be housed within the case 554. The filter 604 may be coupled to the case 554 in a position proximate to (e.g., in front of) the camera flash 550 such that the filter 604 at least partially covers the camera flash 550. For example, the filter 604 may be coupled directly to a surface of the case 554 via an adhesive, one or more fasteners, or the like. By way of another example, the filter 604 may be a component of an assembly that interacts with a mounting bracket (e.g., via an interlocking tab assembly, an adhesive, one or more fasteners, or the like), where the mounting bracket is coupled to the surface of the case 554.

As illustrated in FIG. 7C, the user controller 532 may be housed within the case 554. The filter 604 may be at least partially integrated with the case 554 in a position proximate to (e.g., in front of) the camera flash 550 such that the filter 604 at least partially covers the camera flash 550. For example, the filter 604 may be installed or otherwise inset within a hole or groove of the case 554. By way of another example, the case 554 may be fabricated from a material with light-altering qualities similar to those provided by the filter 604.

Although embodiments of the present disclosure are directed to the camera 546 and/or the camera flash 550 being integrated components of the user controller 532, it is noted herein that the camera 546 and/or the camera flash 550 may be separate components (e.g., are accessories 552) of the user controller 532. Therefore, the above description should not be interpreted as a limitation on the present disclosure but merely an illustration.

Figure 8:
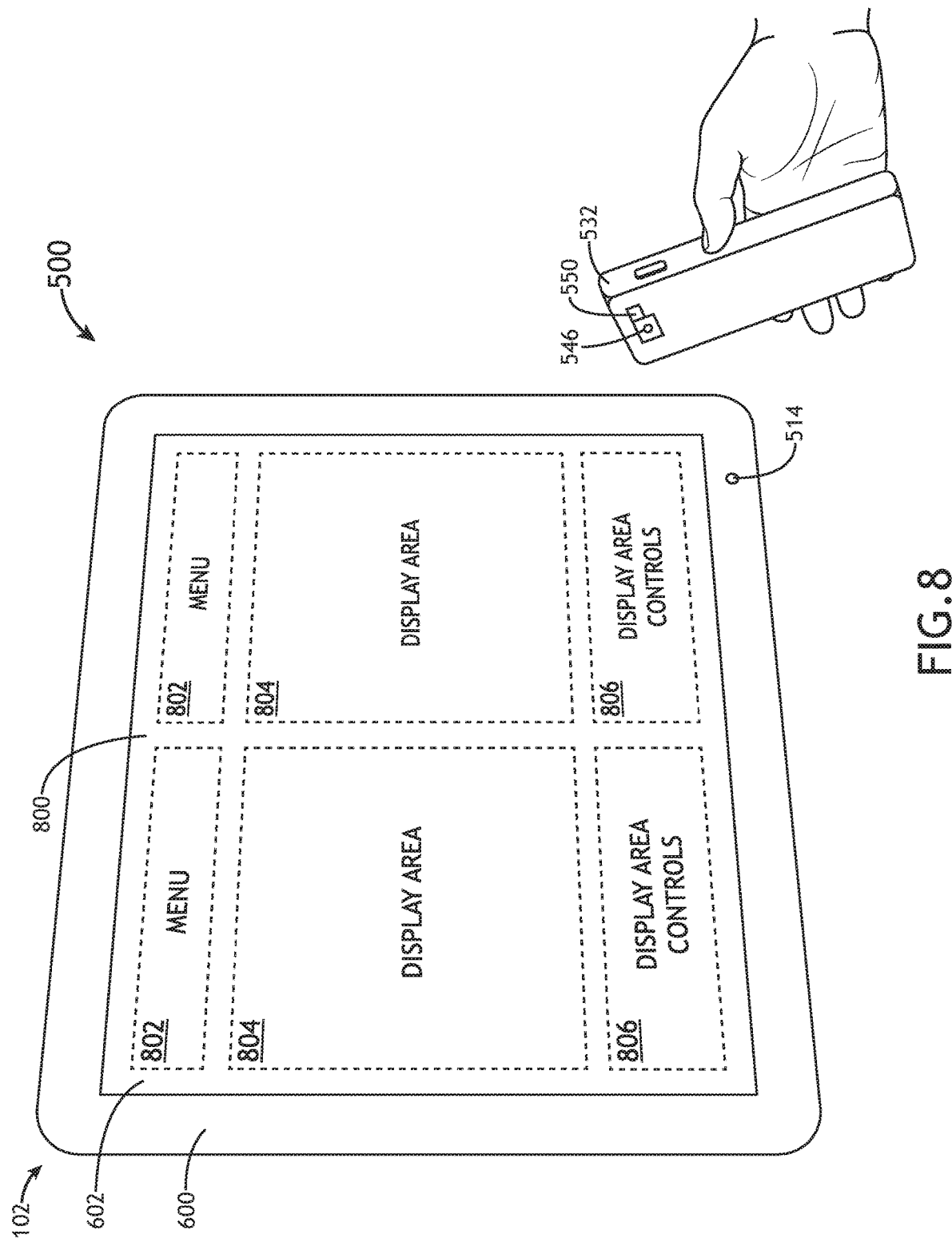
FIG. 8 is an example embodiment of a system for data transfer via a display device including a bezel light sensor, in accordance with the inventive concepts disclosed herein.

FIG. 8 illustrates the system 500 for data transfer via a display device including a bezel light sensor, in accordance with the inventive concepts disclosed herein.

The screen 602 of the display device 102 may include a graphical user interface (GUI) 800, where the GUI 800 includes one or more GUI windows. For example, the one or more GUI windows may include one or more menus 802. By way of another example, the one or more GUI windows may include one or more display areas 804. For instance, where the system 500 is implemented in an avionics environment, the one or more display areas 804 may include, but are not limited to, an avionics systems list, a command list corresponding to the avionics systems list, an avionics systems selection display area for displaying data following a selection being made from the command list, or the like. By way of another example, the one or more GUI windows may include a set of display area controls 806 for the one or more display areas 804.

The bezel 600 may include the bezel light sensor 514. The bezel light sensor 514 may assist in performing a number of functions. For example, the bezel light sensor 514 may assist in preventing screen white-out when entering a sunlit portion of the sky after exiting cloud cover by adjusting screen brightness level. In this regard, the system 500 may be utilized in an avionics environment (e.g., the aircraft cockpit 100, the aircraft galley 200, the aircraft cabin 300), utilized with the UAV control station 400. More generally, the system 500 may be utilized in any vehicle including a display device 102 including the bezel light sensor 514. Therefore, the above description should not be interpreted as a limitation on the present disclosure but merely an illustration.

The system 500 may allow for bi-directional wireless communication between the controller 502 and the user controller 532. For example, the user controller 532 may include a smartphone with the camera 546 and the camera flash 550. For instance, the camera flash 550 may transmit data via a flashing light signal to the controller 502 via the bezel light sensor 514 of the display device 102. In addition, the camera 546 may be utilized to receive information displayed on the display device 102, where the information is displayed either prior to or in response to the data transmitted via the flashing light signal from the camera flash 550 received by the bezel light sensor 514.

Figure 7:
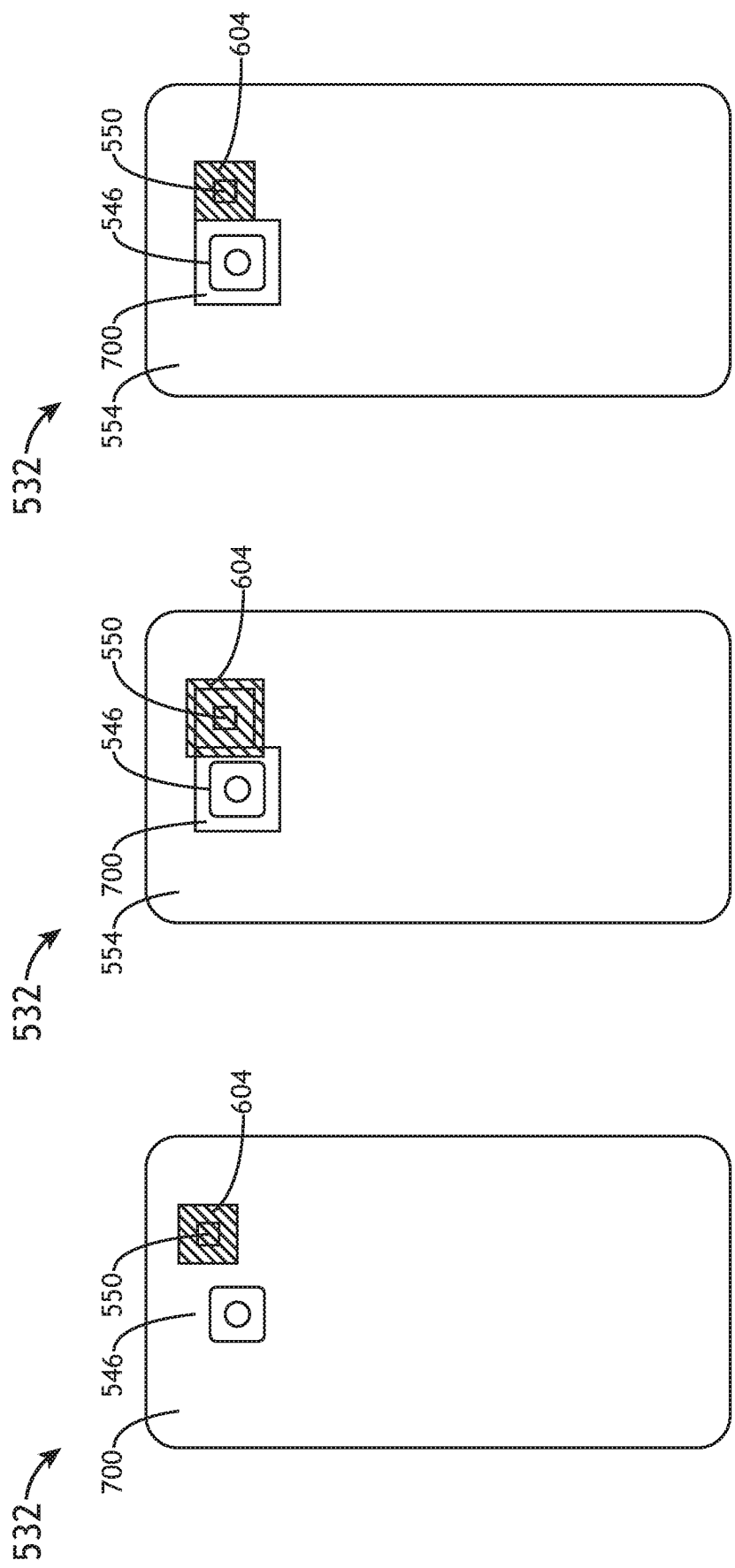
FIG. 7A is an example embodiment of an electronic device, in accordance with the inventive concepts disclosed herein.
FIG. 7B is an example embodiment of an electronic device, in accordance with the inventive concepts disclosed herein.
FIG. 7C is an example embodiment of an electronic device, in accordance with the inventive concepts disclosed herein.

The wavelength of the light may be variable and/or adjustable. For example, the light emanating from the camera flash 550 may be of a wavelength that is readable by the bezel light sensor 514. For instance, the bezel light sensor 514 may be configured to receive light emanating from the camera flash 550 of a wavelength in the visible light spectrum wavelength range (e.g., 400 nanometers (nm)-700 nm). In addition, the filter 604 coupled to the bezel 600 in a position proximate to the bezel light sensor 514, and/or coupled to the user controller 532 in a position proximate to the camera flash 550 may convert the wavelength of a light emanating from the camera flash 550 to fall within a spectrum range including, but not limited to, the infrared spectrum wavelength range (e.g., 700 nm-1000 nm or 1 millimeter (mm)), the ultraviolet spectrum wavelength range (e.g., 10 nm-400 nm), or any other spectrum wavelength range known in the art. As illustrated in FIGS. 6-7C and described above, the filter 604 may be coupled to the bezel 600 proximate to the bezel light sensor 514 and/or may be coupled to the user controller 532 proximate to the camera flash 550.

The rate of flash for the light may be variable and/or adjustable. For example, the light may be transmitted in the form of a known code at a select flash speed. For instance, the code may include, but is not limited to, Morse code. The code transmitted by the flashing light may be pre-determined or dynamic via an application configured to operate with the user controller 532. For example, the code transmitted by the flashing light may be a hexadecimal memory address, a data upload request, or the like. It is noted herein the code transmitted by the flashing light may be patterned or un-patterned. In addition, it is noted herein that the code transmitted by the flashing light may be proprietary, which may provide a layer of security to prevent unauthorized users from accessing the system. Further, it is noted herein the code transmitted by the flashing light may be preceded by an authentication process (e.g., an authentication handshake, a pre-defined security password code, or the like). Further, where the system 500 is implemented in an avionics environment, it is noted herein the avionics environment may include an in-air interlock or lock-out to prevent the requesting and/or uploading of data during operation (e.g., limiting the use of the system 500 to flight testing and/or production access phases).

Figure 9:
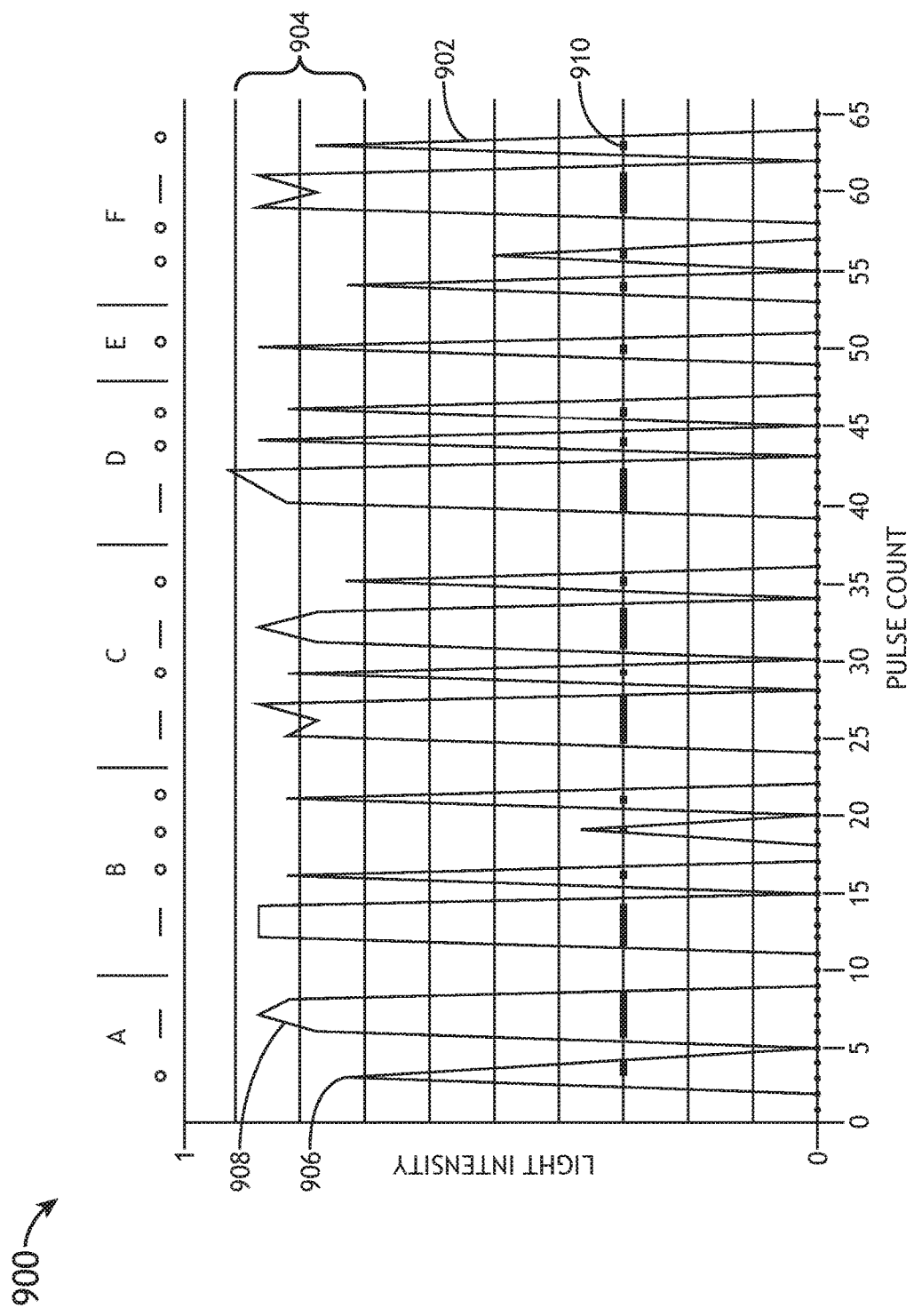
FIG. 9 is a graph of a received code utilized for data transfer via a display device including a bezel light sensor, in accordance with the inventive concepts disclosed herein.

FIG. 9 illustrates a graph of a received code utilized for data transfer via a display device including a bezel light sensor, in accordance with the inventive concepts disclosed herein. In FIG. 9, a graph 900 illustrates data 902 generated by the receipt of a code transmitted by the flashing light including the letters A, B, C, D, E, and F in Morse code via the bezel light sensor 514. It is noted herein the flashing light was generated via the camera flash 550 coupled to the user controller 532. In addition, it is noted herein the data 902 was processed by the bezel light sensor 514, digitized, and monitored through physical output ports coupled to the display device 102, where the physical output ports are subject to the definitions set forth in the ARINC 429 data transfer standard, to illustrate the applicability of the system 500 to avionics systems.

In graph 900, light pulses 904 (or light intensity pulses 904) in the data 902 correspond to the dots and dashes representing the letters provided via Morse code. For example, the graph 900 shows a short light pulse 906 (or light intensity pulse 906) and a long pulse 908 (or light intensity pulse 908) that corresponds to the portion of the received code transmitted by the flashing light representing the letter A. For instance, the short light pulse 906 may correspond to a one-hundred millisecond (ms) light pulse, while the long light pulse 908 may correspond to a three-hundred millisecond light pulse. Overlaid data 910 is provided to illustrate the correspondence between the light pulses 906, 908 to the letters transmitted in Morse code as provided above the graph 900. It is noted herein the example provided with respect to the letter A extends to the other letters B-F.

The light intensity in FIG. 9 is provided as a percentage of possible output for the light source generating the code transmitted by the flashing light and converted to a range between 0 and 1. It is noted herein that the pulse speed in FIG. 9 should not be interpreted as a limitation on the present disclosure but merely an illustration. For example, it is noted herein that the sampling speed of the light should be at least three times the speed of data use, and that the sampling rate would preferably be at least five times the speed of data use.

The duration of the light may be variable and/or adjustable. For example, the light may be flashed for a set period of time, where the set period of time is either pre-determined or dynamic via the application configured to operate with the user controller 532. For instance, a patterned code may be provided once over a set period of time. In addition, a patterned code may be repeated and/or cycled for a set period of time.

The intensity of the light may be variable and/or adjustable via the application configured to operate with the user controller 532. It is noted herein, however, where the user controller 532 is a smartphone with a camera flash 550, different smartphone manufacturers may include camera flashes 550 of different intensities.

Although the graph 900 illustrates the transmission of data via a binary flash on/off pairing, it is noted herein that a variable and/or adjustable wavelength, rate of flash, duration, intensity, or the like may provide a more advanced and/or more efficient algorithm able to accomplish a broader range of data transmission than possible via a binary flash on/off pairing. Therefore, the above description should not be interpreted as a limitation on the present disclosure but merely an illustration.

In addition, it is noted herein that one or more operations of the light production and transmittal by the user controller 532 may be accomplished with the application configured to operate with the user controller 532. For example, the application may include controls to create a flashing light signal that includes a patterned code. By way of another example, the application may include one or more controls necessary to generate a flashing light signal of varying wavelength, flash speed, duration, intensity, or the like. By way of another example, the application may provide a series of one or more calibration tests to allow the camera flash 550 to generate a flashing light signal of varying wavelength, flash speed, duration, intensity, or the like. The application may be proprietary and/or designed in-house. However, it is noted herein that one or more operations of the light production and transmittal by the user controller 532 may be accomplished with built-in and/or third-party applications.

The user controller 532 may transmit different types of information depending on the wavelength, flash speed, duration, intensity, or the like of the light provided by the camera flash 550.

The user controller 532 may transmit a request for one or more sets of data from the controller 502. Upon receipt of the request for one or more sets of data via the bezel light sensor 514, one or more responses may be provided on the display device 102.

Figure 10:
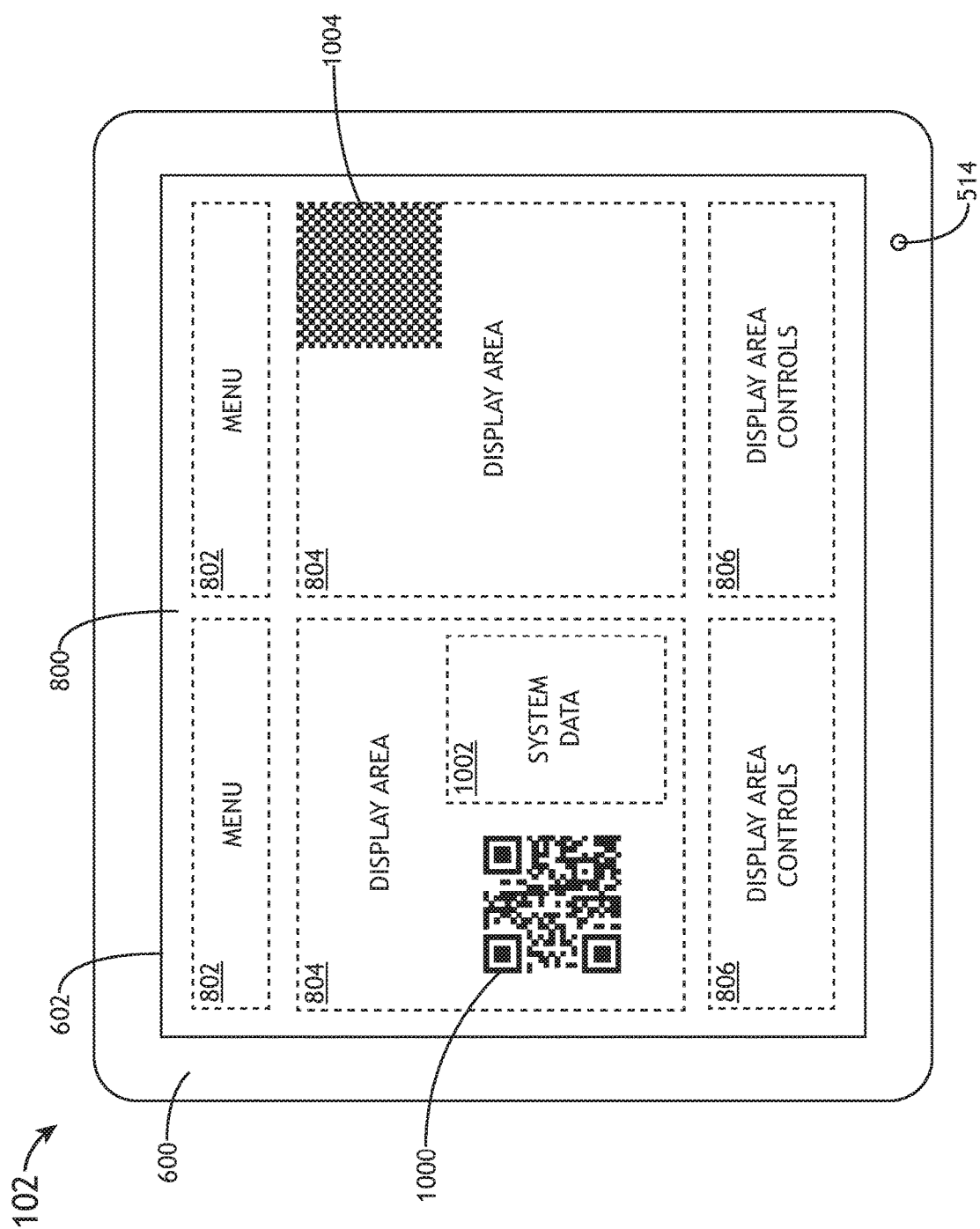
FIG. 10 is an example embodiment of a display device including a bezel light sensor, in accordance with the inventive concepts disclosed herein.

FIG. 10 is an example embodiment of a display device utilized for data transfer via a display device including a bezel light sensor, in accordance with the inventive concepts disclosed herein.

The one or more responses may include, but are not limited to, one or more dynamic quick response (QR) codes displayed on the screen 602 and/or data encoded into one or more graphical elements on the screen 602 using one or more steganography techniques, where data is hidden within an ordinary image in an unnoticeable way via an encoding algorithm (e.g., an encoding algorithm that defines bit values as corresponding to colors, where the colors may include minor variations in standard pixel color). It is noted herein that systems and methods for responding to memory retrieval requests via steganography is described in U.S. Pat. No. 10,425,461, issued on Sep. 24, 2019, naming James M. Zaehring as inventor, which is incorporated herein by reference in the entirety. In addition, it is noted herein that systems and methods for responding to memory retrieval requests via QR code under the ARINC 661 standard protocol is described in U.S. Pat. No. 10,108,889, issued on Oct. 23, 2018, naming James M. Zaehring and Travis J. Floyd as inventors, which is incorporated herein by reference in the entirety.

The QR code 1000 may be displayed on the GUI 800 (e.g., a QR code widget) on the display device 102. One or more QR code data area GUI windows 1002 may be provided with the QR code 1000 to provide supplementary information with the QR code 1000 (e.g., memory location of data provided with the QR code 1000, or the like). The QR code 1000 may correspond to a particular data set located in response to the request for one or more data sets. Where the display device 102 including the bezel light sensor 514 is a component on an aircraft, the QR code 1000 may be subject to the definitions set forth in the ARINC 661 cockpit display system (CDS) and user applications (UA) standard. The camera 546 may be utilized to scan the QR code 1000 for recordation and/or analysis by the user controller 532 and/or another coupled controller.

It is noted herein that a graphical element may be displayed over the location of the QR code 1000 within the QR code widget. For example, the graphical element may be displayed while the controller 502 is preparing the QR code 1000 and/or while the controller 502 is awaiting a response from the user controller 532. For instance, the graphical element may be a dynamic element including, but not limited to, an hourglass or the like. In addition, the graphical element may be a static element including, but not limited to, a confirmation symbol, a colored box, a logo, or the like.

The one or more responses may be in the form of data dynamically encoded into one or more graphical elements of the one or more GUI windows 802, 804, 806, and/or 1002 of the GUI 800. For example, the data may be hidden by the encoding algorithm within one or more pixels 1004 of the one or more graphical elements within the one or more GUI windows 802, 804, 806, and/or 1002 of the GUI 800. For example, a pixel 1004 may include three eight-bit values. The camera 546 may be utilized to scan the one or more graphical elements for recordation and/or analysis (e.g., decoding) by the user controller 532 and/or another coupled controller. For example, the camera 546 may be of sufficient resolution to distinguish the one or more pixels 1004 including the encoded data from the remainder of the one or more pixels 1004.

It is noted herein that the user controller 532 may scan and/or record the QR code and/or a set of steganographic data may be accomplished with an application. For example, the application may include a QR code reader that utilizes the camera 546 to scan and/or record the QR code 1000 displayed on the screen 602 of the display device 102 coupled to the controller 502. By way of another example, the application may utilize the camera 546 to scan, record, and/or decode the steganographic data displayed on the screen 602 of the display device 102 coupled to the controller 502. The application may be proprietary and/or designed in-house. However, it is noted herein that one or more operations of the light production and transmittal by the user controller 532 may be accomplished with built-in and/or third-party applications.

In addition, it is noted herein that a QR code and/or a set of steganographic data may only contain a select amount of data, Where the requested one or more sets of data are too large to be provided within a single response (e.g., a single QR code or embedded within available pixels 1004), the controller 502 may need to generate and display multiple QR codes and/or multiple sets of steganographic data, where each QR code and/or set of steganographic data provides only a portion of the requested one or more sets of data. In this example, the user controller 532 may transmit a flashing light signal including a continue signal (e.g., a single flash, a code including a continue command, or the like) indicating that the controller 502 may provide an additional response including a portion of the requested one or more sets of data when the user controller 532 is ready to receive the additional response. In the alternative, the controller 502 may transmit the additional portion after waiting a pre-determined amount of time. In this regard, the QR code 1000 and/or the set of steganographic data hidden within the one or more pixels 1004 may be dynamic, allowing for the increased amount of transferable data via the GUI 800.

It is noted herein that feedback (e.g., a success signal) regarding the success of data capture via steganography and QR codes increases the reliability of the data transfer. For example, the feedback may be in the form of an ACK/NAK (or ACK/NACK) protocol utilizing acknowledgement and negative-acknowledgement signals, a flash from the camera flash 550, a graphical element displayed on the screen 602 of the display device 102, or the like.

In this regard, dynamic QR codes and dynamically-hidden data encoded via steganographic techniques may provide targeted information (e.g., targeted troubleshooting data, or the like) specific to a current issue in response to requests for the one or more sets of data from the user controller 532 via the bezel light sensor 514. For example, where the system 500 is implemented in an avionics environment, this dynamic providing of data may allow for the routing of memory troubleshooting via PEEK and/or POKE techniques through the ARINC 661 protocol instead of wired physical ports, expanding the use of the PEEK and/or POKE techniques. It is noted herein, however, that PEEK and/or POKE techniques are not limited to the ARINC 661 protocol. In addition, it is noted herein that the system 500 is not limited to providing dynamic QR codes and dynamically-hidden data encoded via steganographic techniques as responses to received data requests. Therefore, the above description should not be interpreted as a limitation on the present disclosure but merely an illustration.

The user controller 532 may transmit one or more sets of data to be uploaded to the controller 502 as a whole or in one or more packets. For example, the data may include updates to software or firmware, new data for the controller 502 to analyze, or the like. For instance, the data may be uploaded via protocols that transmit data at speeds ranging from kbits/sec to Mbits/sec utilizing infrared light (e.g., protocols defined by the Infrared Data Association (IrDA) including, but not limited to, Infrared Physical Layer Specification (IrPHY), Infrared Link Access Protocol (IrLAP), Infrared Link Management Protocol (IrLMP), Infrared Local Area Network (IrLAN), IrSimple, or the like), where the bezel light sensor 514 and/or the camera flash 550 is covered by the filter 604. In addition, the data may be uploaded via protocols adapted to visible light spectrums.

Where the data is uploaded in packets, the controller 502 may indicate it is ready to receive the next data upload packet (e.g., via an ACK/NA(C)K protocol response, a dynamic or static graphical element, or the like) via a continue signal on the display device 102. In the alternative, the user controller 532 may transmit the next data upload packet after waiting a pre-determined amount of time. Once all data upload packets are received, the update may be reconstructed and installed. In addition, the user controller 532 may provide a code to reset the controller 502 to factory settings if necessary.

Where the system 500 is implemented within an avionics environment, implementing the improved diagnostic capabilities afforded by the system 500 may only require updating of software and/or firmware within the controller 502 as the system 500 is wireless and employs pre-existing aircraft sensors (e.g., the bezel light sensor 514). In this regard, additional hardware (e.g., wired diagnostic ports) may not need to be added to the avionics environment, greatly reducing the amount of time and/or funding required to incorporate the improved diagnostic capabilities within the avionics environment.

As such, the system 500 may allow for dynamic and live-configurable requesting of and retrieval of troubleshooting data of an avionics environment. In addition, the system 500 may also reduce the amount of time necessary to analyze avionics systems within the avionics environment. Further, the system 500 may allow for dynamic updating of software and/or resetting to factory options via wireless operations instead of wired physical ports. In this regard, the amount and/or criticality of time, funds, paperwork, and coordination between involved parties during design, testing, and certification phases may be reduced.

FIGS. 11-14 generally illustrate methods for data transfer via a display device including a bezel light sensor, in accordance with the inventive concepts herein.

Figure 11:
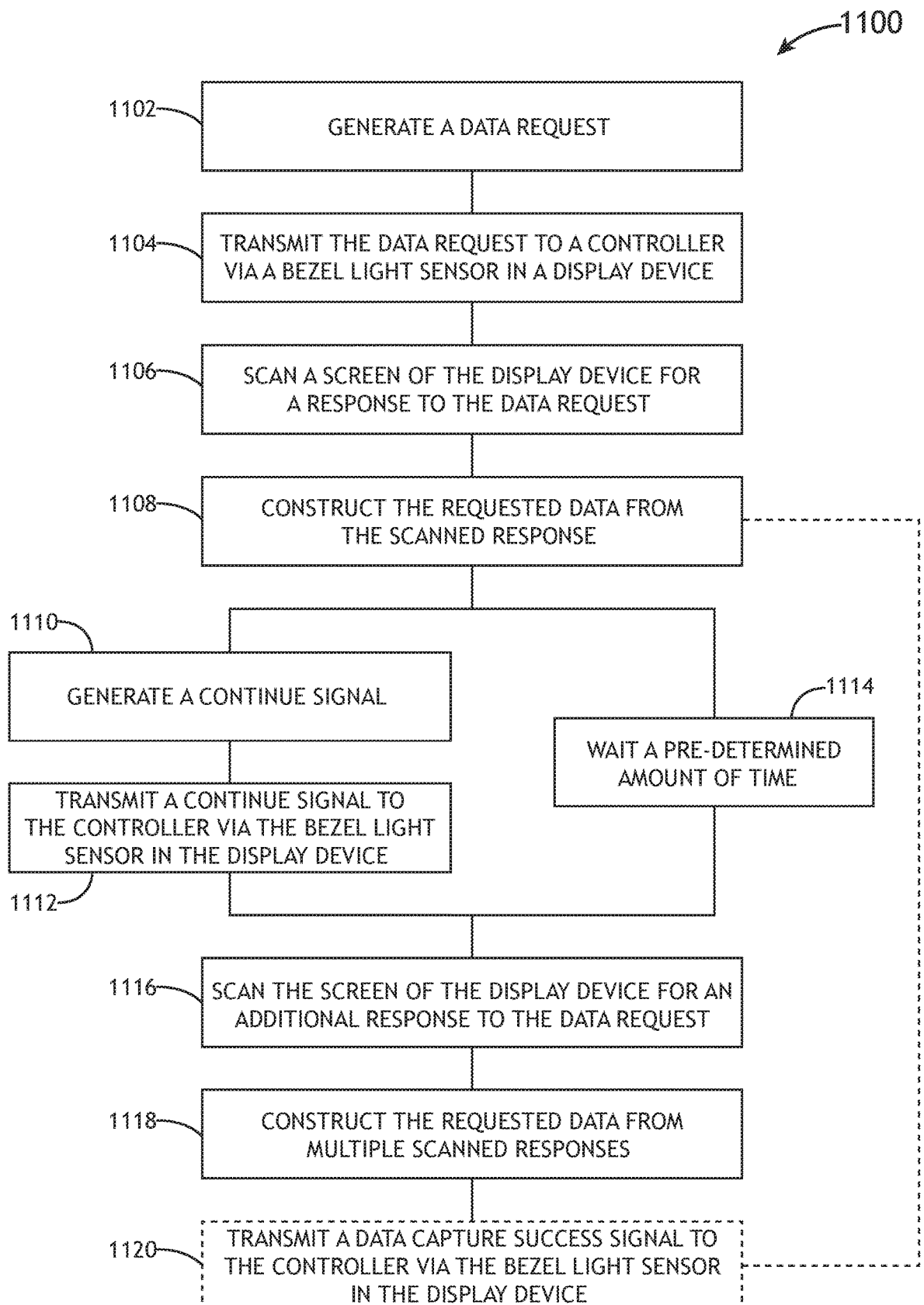
FIG. 11 is a flowchart of an exemplary method for data transfer via a display device including a bezel light sensor, in accordance with the inventive concepts disclosed herein.

FIG. 11 illustrates a method 1100 for data transfer via a display device including a bezel light sensor, in accordance with the inventive concepts disclosed herein. In one example, the method 1100 may be implemented by the user controller 532 of the system 500.

A step 1102 may include generating a data request. The data request may be generated via an application loaded onto the user controller 532, where the application includes one or more sets of program instructions configured to cause the processors of the user controller 532 to generate the data request.

A step 1104 may include transmitting the data request to a controller via a bezel light sensor in a display device. The data request may be transmitted as one or more light flashes from the camera flash 550 coupled to the user controller 532. The controller 502 may receive the data request via the bezel light sensor 514 in the display device 102.

A step 1106 may include scanning a screen of the display device for a response to the data request. The user controller 532 may be positioned to allow the camera 546 to scan the one or more GUI windows 802, 804, 806, and/or 1002 of the GUI 800. The controller 502 may generate a response to the data request and provide it on the GUI 800. For example, the response may be in the form of the QR code 1000. By way of another example, the response may include data encoded via one or more steganographic techniques into the one or more pixels 1004 of the one or more graphical elements within the one or more GUI windows 802, 804, 806, and/or 1002 on the GUI 800. It is noted herein the response may be the first response of a set of multiple responses.

A step 1108 may include constructing the requested data from the scanned response. Where the scanned response is the only response from the controller 502, the requested data is the scanned response.

A step 1110 may include generating a continue signal. The continue signal may be generated via an application loaded onto the user controller 532, where the application includes one or more sets of program instructions configured to cause the processors of the user controller 532 to generate the continue signal.

A step 1112 may include transmitting the continue signal to the controller via the bezel light sensor in the display device. The continue signal may be transmitted to the controller 502 by the user controller 532. For example, the continue signal may be transmitted as one or more light flashes from the camera flash 550 coupled to the user controller 532. The controller 502 may receive the continue signal via the bezel light sensor 514 on the display device 102.

As an alternative to steps 1110 and 1112, a step 1114 may include waiting a pre-determined amount of time. The one or more sets of program instructions configured to cause the processors of the user controller 532 may include a pre-determined amount of time between receiving responses. For example, the pre-determined period of time may take into account the amount of time necessary for the user controller 532 to stop transmitting the data request with the camera flash 550, be re-positioned to a scanning position, activate the camera 546, scan the screen 602 of the display device 102 for a response, store the scanned response to memory 536, analyze the scanned and/or stored response with the one or more processors 534, or take another action.

A step 1116 may include scanning the screen of the display device for an additional response to the data request. The controller 502 may generate an additional response to the data request and provide it on the GUI 800. For example, the additional response may be in the form of the QR code 1000. By way of another example, the additional response may include data encoded via one or more steganographic techniques into the one or more pixels 1004 of the one or more graphical elements within the one or more GUI windows 802, 804, 806, and/or 1002 on the GUI 800.

It is noted herein the response to the data request and the additional response may be repeated on the screen of the display device. For example, the response to the data request and the additional response may be repeated a set number of cycles. By way of another example, the response to the data request and the additional response may be repeated a set amount of time. By way of another example, the response to the data request and the additional response may be repeated until a stop signal is received from the user controller 532.

A step 1118 may include constructing the requested data from the multiple scanned responses (e.g., the first response and the additional response, or the like). For example, the user controller 532 may reconstruct the requested data from multiple scanned dynamic QR codes 1000. By way of another example, the user controller 532 may reconstruct the requested data from multiple scanned sets of data encoded into pixels 1004 via one or more steganographic techniques. By way of another example, the user controller 532 may reconstruct the requested data from a combination of one or more scanned dynamic QR codes 1000 and one or more scanned sets of data encoded into the one or more pixels 1004 via the one or more steganographic techniques. It is noted herein the one or more sets of program instructions 538 may be configured to cause the processors 534 of the user controller 532 to store the responses and construct the requested data from the scanned responses after all responses are scanned and stored, to store the responses and construct the requested data in batches after a select number of the responses are scanned and stored, and/or to construct the requested data as each response is scanned. In addition, it is noted herein the scanned responses may include a marker (e.g., sequential number, value, label, or the like) to assist the user controller 532 in constructing the response from the scanned responses.

An optional step 1120 may include transmitting a data capture success signal to the controller via the bezel light sensor in the display device. The success signal may be generated via an application loaded onto the user controller 532, where the application includes one or more sets of program instructions configured to cause the processors of the user controller 532 to generate the success signal. The success signal may be transmitted by the user controller 532 to the controller 502. For example, the success signal may be transmitted as one or more light flashes from the camera flash 550 coupled to the user controller 532. By way of another example, the controller 502 may receive the success signal via the bezel light sensor 514 on the display device 102.

Figure 12:
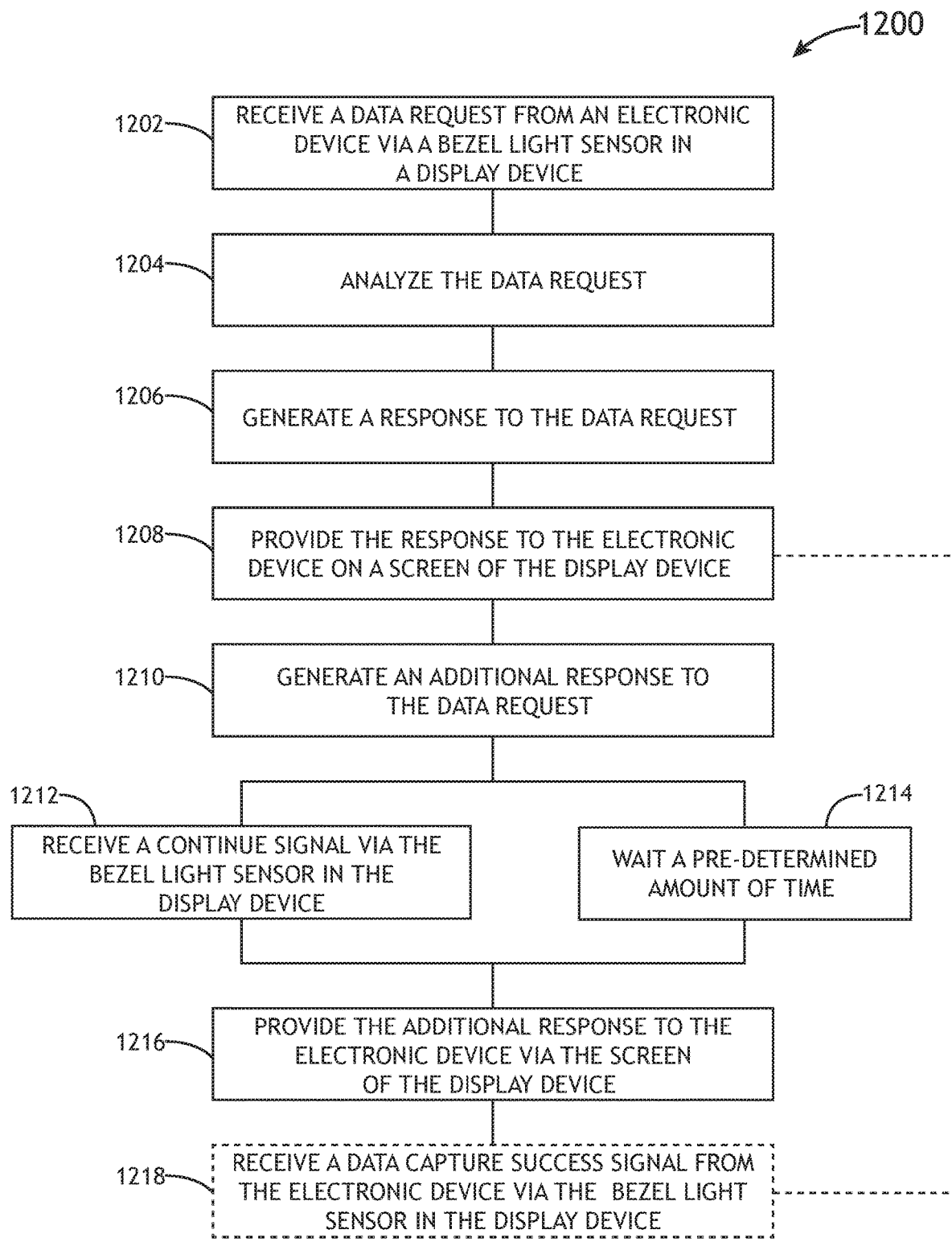
FIG. 12 is a flowchart of an exemplary method for data transfer via a display device including a bezel light sensor, in accordance with the inventive concepts disclosed herein.

FIG. 12 illustrates a method 1200 for data transfer via a display device including a bezel light sensor, in accordance with the inventive concepts disclosed herein. In one example, the method 1200 may be implemented by the controller 502 coupled to the one or more display devices 102 of the system 500.

A step 1202 may include receiving a data request from an electronic device via a bezel light sensor in a display device. The controller 502 may receive the data request via the bezel light sensor 514 on the display device 102. The data request may be transmitted by the user controller 532. For example, the data request may be transmitted a one or more light flashes from the camera flash 550 coupled to the user controller 532.

A step 1204 may include analyzing the data request. The user controller 532 may include one or more sets of program instructions configured to cause the processors of the user controller 532 to analyze the data request for a pattern, and one or more additional sets of program instructions to decode the pattern. For example, the pattern may include a request for data such as, but not limited to, error data, log data, system state data, or other data that may be utilized to perform diagnostic tests.

A step 1206 may include generating a response to the data request. The controller 502 may locate the data corresponding to the requested information. For example, the controller 502 may retrieve data stored at the hexadecimal memory addresses. By way of another example, the controller 502 may retrieve operational statuses of systems coupled to the controller 502. For instance, where the system 500 is implemented in an avionics environment, the operational statuses may include data obtained via the one or more sensors 530 coupled to the FMS 516, error checks performed by the FMS 516, or the like. It is noted herein the generated response may be the first generated responses of a set of multiple generated responses.

A step 1208 may include providing the response to the electronic device on a screen of the display device. For example, the response may be in the form of a QR code 1000. By way of another example, the response may include data encoded via one or more steganographic techniques into one or more pixels 1004 of the one or more graphical elements within the one or more GUI windows 802, 804, 806, and/or 1002 on the GUI 800.

A step 1210 may include generating an additional response to the data request. The controller 502 may locate the data corresponding to the requested information. For example, the controller 502 may retrieve data stored at the hexadecimal memory addresses. By way of another example, the controller 502 may retrieve operational statuses of systems coupled to the controller 502. For instance, where the system 500 is implemented in an avionics environment, the operational statuses may include data obtained via the one or more sensors 530 coupled to the FMS 516, error checks performed by the FMS 516, or the like.

A step 1212 may include receiving a continue signal via the bezel light sensor in the display device. The continue signal may be transmitted to the controller 502 by the user controller 532. For example, the continue signal may be transmitted as one or more light flashes from the camera flash 550 coupled to the user controller 532. The controller 502 may receive the continue signal via the bezel light sensor 514 on the display device 102.

As an alternative to step 1212, a step 1214 may include waiting a pre-determined amount of time. The one or more sets of program instructions configured to cause the processors of the controller 502 may include a pre-determined period of wait time between providing responses. For example, the pre-determined amount of wait time may take into account the amount of time necessary for the user controller 532 to stop transmitting the data request with the camera flash 550, be re-positioned to a scanning position, activate the camera 546, scan the screen 602 of the display device 102 for a response, store the scanned response to memory 536, analyze the scanned and/or stored response with the one or more processors 534, or take another action.

A step 1216 may include providing the additional response to the electronic device via the screen of the display device. For example, the response may be in the form of a QR code 1000. By way of another example, the response may include data encoded via one or more steganographic techniques into one or more pixels 1004 of the one or more graphical elements within the one or more GUI windows 802, 804, 806, and/or 1002 on the GUI 800.

It is noted herein the response to the data request and the additional response may be repeated on the screen of the display device. For example, the response to the data request and the additional response may be repeated a set number of cycles. By way of another example, the response to the data request and the additional response may be repeated a set amount of time. By way of another example, the response to the data request and the additional response may be repeated until a stop signal is received from the user controller 532.

An optional step 1218 may include receiving a data capture success signal from the electronic device via the bezel light sensor in the display device. The success signal may be transmitted by the user controller 532. For example, the success signal may be transmitted as one or more light flashes from the camera flash 550 coupled to the user controller 532. The controller 502 may receive the success signal via the bezel light sensor 514 on the display device 102.

Figure 13:
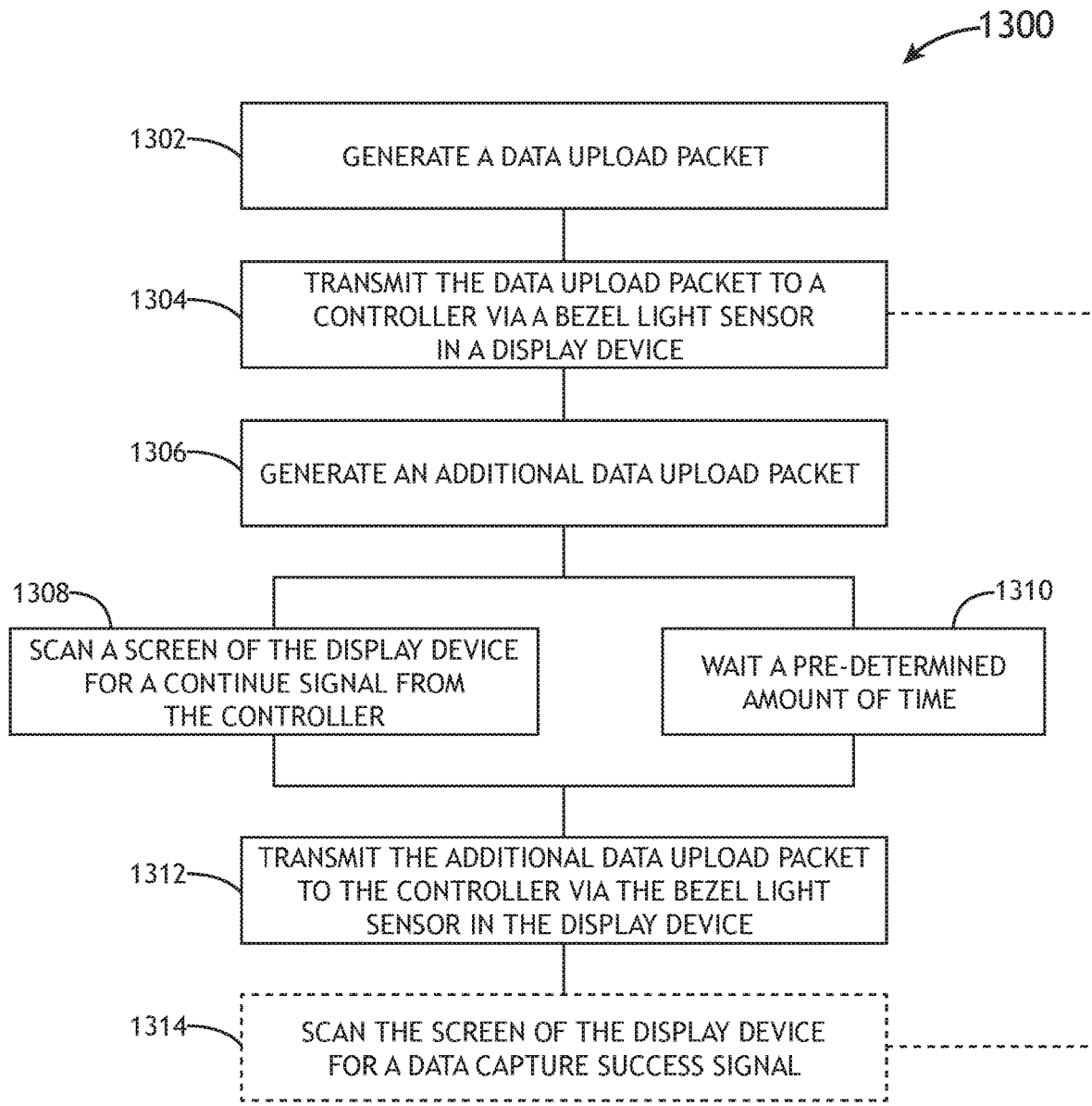
FIG. 13 is a flowchart of an exemplary method for data transfer via a display device including a bezel light sensor, in accordance with the inventive concepts disclosed herein.

FIG. 13 illustrates a method 1300 for data transfer via a display device including a bezel light sensor, in accordance with the inventive concepts disclosed herein. In one example, the method 1300 may be implemented by the user controller 532 of the system 500.

A step 1302 may include generating a data upload packet. The data upload packet may be generated via an application loaded onto the user controller 532, where the application includes one or more sets of program instructions configured to cause the processors of the user controller 532 to generate the data upload packet. It is noted herein the data upload packet may be the first data upload packet of a set of multiple data upload packets.

A step 1304 may include transmitting the data upload packet to a controller via a bezel light sensor in a display device. The data upload packet may be transmitted as one or more light flashes from the camera flash 550 coupled to the user controller 532. The controller 502 may receive the data upload packet via the bezel light sensor 514 in the display device 102.

A step 1306 may include generating an additional data upload packet. The additional data upload packet may be generated via an application loaded onto the user controller 532, where the application includes one or more sets of program instructions configured to cause the processors of the user controller 532 to generate the additional data upload packet.

A step 1308 may include scanning a screen of the display device for a continue signal from the controller. The user controller 532 may be positioned to allow the camera 546 to scan the one or more GUI windows 802, 804, 806, and/or 1002 of the GUI 800. The controller 502 may generate a continue signal and provide it on the GUI 800. For example, the continue signal may be in the form of a QR code 1000. By way of another example, the continue signal may include data encoded via one or more steganographic techniques into one or more pixels 1004 of the one or more graphical elements within the one or more GUI windows 802, 804, 806, and/or 1002 on the GUI 800.

As an alternative to step 1308, a step 1310 may include waiting a pre-determined amount of time. The one or more sets of program instructions configured to cause the processors of the user controller 532 may include a pre-determined period of wait time between transmitting data upload packets. For example, the pre-determined period of wait time may take into account the amount of time necessary for the user controller 532 to stop transmitting the data upload packet with the camera flash 550, be re-positioned to a scanning position, activate the camera 546, retrieve and/or compile the additional data uploaded packet, or take another action.

A step 1312 may include transmitting the additional data upload packet to the controller via the bezel light sensor in the display device. The additional data upload packet may be transmitted as one or more light flashes from the camera flash 550 coupled to the user controller 532. The controller 502 may receive the additional data upload packet via the bezel light sensor 514 in the display device 102.

It is noted herein the data upload packet and the additional data upload packet may be repeated on the screen of the display device. For example, the data upload packet and the additional data upload packet may be repeated a set number of cycles. By way of another example, the data upload packet and the additional data upload packet may be repeated a set amount of times. By way of another example, the data upload packet and the additional data upload packet may be repeated until a stop signal is received by the user controller 532.

An optional step 1314 may include scanning the screen of the display device for a data capture success signal. The user controller 532 may be positioned to allow the camera 546 to scan the one or more GUI windows 802, 804, 806, and/or 1002 of the GUI 800. The controller 502 may generate a success signal and provide it on the GUI 800. For example, the success signal may be in the form of a QR code 1000. By way of another example, the success signal may include data encoded via one or more steganographic techniques into one or more pixels 1004 of the one or more graphical elements within the one or more GUI windows 802, 804, 806, and/or 1002 on the GUI 800.

Figure 14:
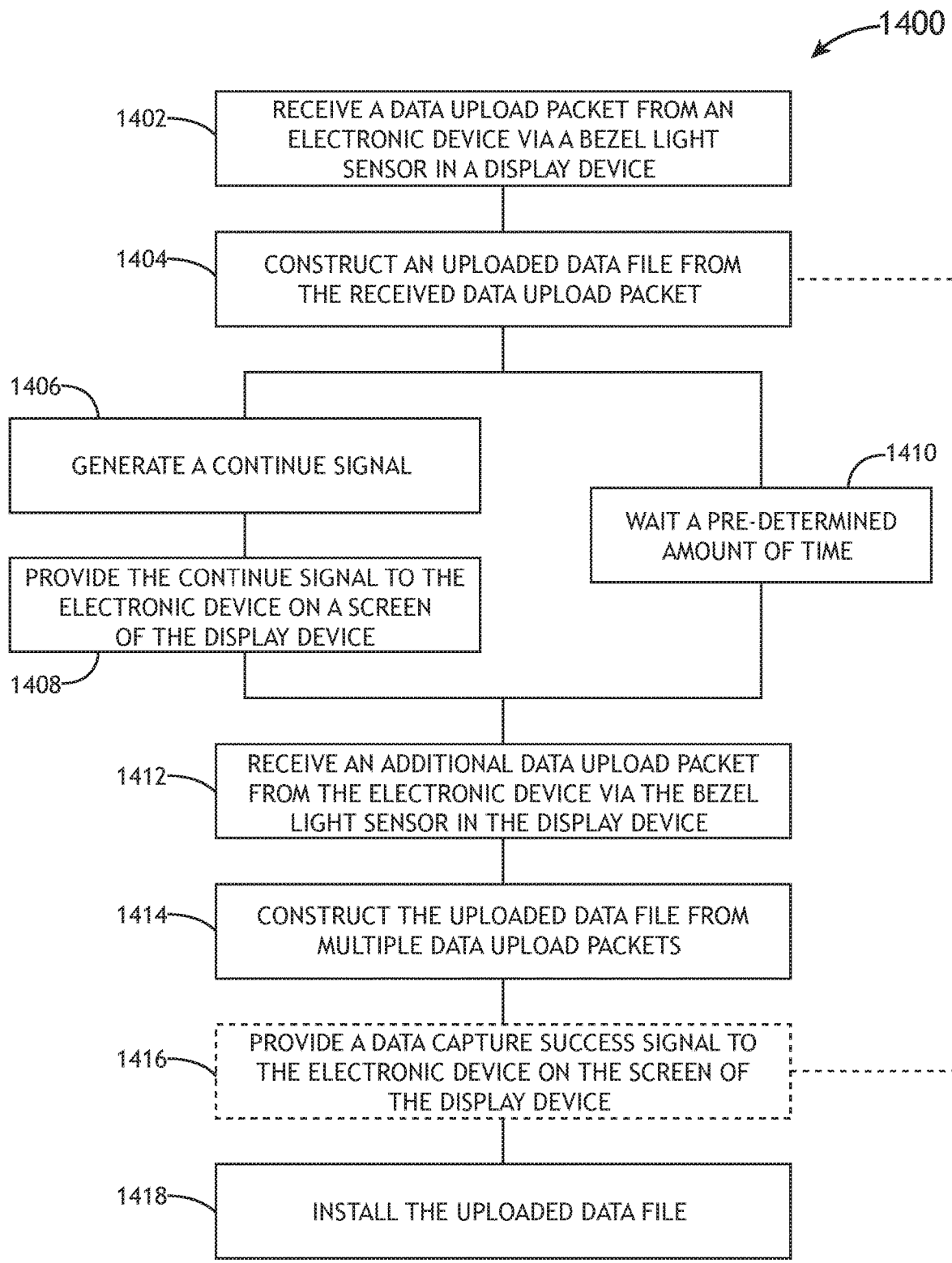
FIG. 14 is a flowchart of an exemplary method for data transfer via a display device including a bezel light sensor, in accordance with the inventive concepts disclosed herein.

FIG. 14 illustrates a method 1400 for data transfer via a display device including a bezel light sensor, in accordance with the inventive concepts disclosed herein. In one example, the method 1400 may be implemented by the controller 502 coupled to the one or more display devices 102 of the system 500.

A step 1402 may include receiving a data upload packet from an electronic device via a bezel light sensor in a display device. The controller 502 may receive the data upload packet via the bezel light sensor 514 on the display device 102. The data upload packet may be transmitted by the user controller 532. For example, the data upload packet may be transmitted as one or more light flashes from the camera flash 550 coupled to the user controller 532. It is noted herein the data upload packet may be the first data upload packet of a set of multiple data upload packets.

A step 1404 may include constructing an uploaded data file from the received data upload packet. Where the uploaded data packet is the only received packet from the user controller 532, the uploaded data file includes the received uploaded data packet.

A step 1406 may include generating a continue signal. The continue signal may be generated via an application loaded onto the controller 502, where the application includes one or more sets of program instructions configured to cause the processors of the controller 502 to generate the continue signal.

A step 1408 may include providing the continue signal to the electronic device on a screen of the display device. For example, the continue signal may be in the form of the QR code 1000. By way of another example, the continue signal may include data encoded via one or more steganographic techniques into the one or more pixels 1004 of the one or more graphical elements within the one or more GUI windows 802, 804, 806, and/or 1002 on the GUI 800.

As an alternative to steps 1406 and 1408, a step 1410 may include waiting a pre-determined amount of time. The one or more sets of program instructions configured to cause the processors of the controller 502 may include a pre-determined period of wait time between receiving data upload packets. For example, the pre-determined period of wait time may take into account the amount of time necessary for the user controller 532 to stop transmitting the data upload packet with the camera flash 550, be re-positioned to a scanning position, activate the camera 546, retrieve and/or compile the additional data uploaded packet, or take another action.

A step 1412 may include receiving an additional data upload packet from the electronic device via the bezel light sensor in the display device. The controller 502 may receive the additional data upload packet via the bezel light sensor 514 on the display device 102. The additional data upload packet may be transmitted by the user controller 532. For example, the additional data upload packet may be transmitted as one or more light flashes from the camera flash 550 coupled to the user controller 532.

It is noted herein the data upload packet and the additional data upload packet may be repeated on the screen of the display device. For example, the data upload packet and the additional data upload packet may be repeated a set number of cycles. By way of another example, the data upload packet and the additional data upload packet may be repeated a set amount of times. By way of another example, the data upload packet and the additional data upload packet may be repeated until a stop signal is received by the user controller 532.

A step 1414 may include constructing the uploaded data file from multiple data upload packets. The data upload packets may include a marker (e.g., sequential number, value, or the like) to assist the controller 502 in constructing the response from the scanned responses. In addition, it is noted herein the one or more sets of program instructions 508 may be configured to cause the processors 504 of the controller 502 to store the data upload packets and construct the uploaded data file from the data upload packets after all are uploaded and stored, to store the data upload packets and construct the uploaded data file in batches after a select number of the data upload packets are uploaded and stored, and/or to construct the data upload packets as each data upload packet is uploaded.

An optional step 1416 may include providing a data capture success signal to the electronic device on the screen of the display device. The success signal may be generated via an application loaded onto the controller 502, where the application includes one or more sets of program instructions configured to cause the processors of the controller 502 to generate the success signal. The success signal may be provided by the controller 502 to the user controller 532. For example, the continue signal may be in the form of the QR code 1000. By way of another example, the continue signal may include data encoded via one or more steganographic techniques into the one or more pixels 1004 of the one or more graphical elements within the one or more GUI windows 802, 804, 806, and/or 1002 on the GUI 800.

A step 1418 may include installing the uploaded data file. The uploaded data file may include one or more updates to software and/or firmware installed on the controller 502 and/or on systems coupled to the controller 502.

It is noted herein the methods 1100, 1200, 1300, 1400 are not limited to the steps provided. For example, the methods 1100, 1200, 1300, 1400 may instead include more or fewer steps. By way of another example, the methods 1100, 1200, 1300, 1400 may perform the steps in an order other than provided. Therefore, the above description should not be interpreted as a limitation on the scope of the present disclosure, but merely an illustration.

As will be appreciated from the above embodiments, the inventive concepts disclosed herein are directed to a system and method for data transfer via a display device including a bezel light sensor, where data is transmitted to and/or acquired from the display device including the bezel light sensor.

It is to be understood that embodiments of the methods in accordance with the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An avionics display system, comprising:
a display device, comprising:
a bezel, the bezel including a bezel light sensor; and
a screen set within the bezel; and
a controller coupled to the bezel light sensor, the controller configured to:
receive a flashing light signal via the bezel light sensor, the flashing light signal comprising a set of coded information, the flashing light signal transmitted by a light generator of an electronic device, a filter being couplable to at least one of the electronic device at a position proximate to the light generator or the display device at a position proximate to the bezel light sensor, the wavelength of the flashing light signal being a first wavelength, the filter configured to convert the first wavelength to a second wavelength;
generate a response to the set of coded information; and
provide the response to the set of coded information via the screen.

2. The avionics display system in claim 1, the set of coded information comprising a request for a set of data retrievable via the controller.

3. The avionics display system in claim 2, the response comprising one or more dynamic quick response (QR) codes corresponding to the set of data retrievable via the controller.

4. The avionics display system in claim 2, the response comprising the set of data retrievable via the controller, the set of data encoded via one or more steganography techniques in one or more graphical elements of one or more graphical user interface (GUI) windows on the screen.

5. The avionics display system in claim 2, the flashing light signal being a first flashing light signal, the response being a first response, the controller further configured to:
at least one of:

receive a second flashing light signal comprising a continue signal via the bezel light sensor; or wait a pre-determined amount of time;

generate a second response to the set of coded information via the controller; and provide the second response via the screen.

6. The avionics display system in claim 1, the set of coded information comprising a data upload packet comprising a set of data to be uploaded to the controller.

7. The avionics display system in claim 6, the data upload packet being a first data upload packet, the controller further configured to:

at least one of:

display a continue signal on the screen; or wait a pre-determined amount of time;

receive a second data upload packet via the bezel light sensor; and construct an uploaded data file from the first data upload packet and the second data upload packet.

8. The avionics display system in claim 1, the flashing signal comprising at least one of a variable wavelength, a variable rate of flashing, a variable duration, or a variable intensity.

9. The avionics display system in claim 1, the response provided on the screen scannable via an imaging device, the light generator and the imaging device coupled to a user controller of the electronic device.

10. A method comprising:

receiving a flashing light signal via a bezel light sensor in a bezel of a display device, the flashing light signal comprising a set of coded information, the flashing light signal transmitted by a light generator of an electronic device, a filter being couplable to at least one of the electronic device at a position proximate to the light generator or the display device at a position proximate to the bezel light sensor, the wavelength of the flashing light signal being a first wavelength, the filter configured to convert the first wavelength to a second wavelength;

generating a response to the set of coded information; and providing the response via a screen set within the bezel of the display device.

11. The method in claim 10, the set of coded information comprising a request for a set of data.

12. The method in claim 11, the response comprising one or more dynamic quick response (QR) codes corresponding to the set of data.

13. The method in claim 11, the response comprising the set of data, the set of data encoded via one or more steganography techniques in one or more graphical elements of one or more graphical user interface (GUI) windows on the screen.

14. The method in claim 11, the flashing light signal being a first flashing light signal, the response being a first response, the method further comprising:

at least one of:

receiving a second flashing light signal comprising a continue signal via the bezel light sensor; or waiting a pre-determined amount of time;

generating a second response to the set of coded information via the controller; and providing the second response via the screen of the display device.

15. The method in claim 10, the set of coded information comprising a data upload packet comprising a set of data to be uploaded to the controller.

16. The method in claim 15, the data upload packet being a first data upload packet, the method further comprising:

at least one of:

displaying a continue signal on the screen; or waiting a pre-determined amount of time;

receiving a second data upload packet; and constructing an uploaded data file from the first data upload packet and the second data upload packet.

17. The method in claim 10, the flashing signal comprising at least one of a variable wavelength, a variable rate of flashing, a variable duration, or a variable intensity.

18. The method in claim 10, the response provided on the screen scannable via an imaging device, the light generator and the imaging device coupled to a user controller of the electronic device.

19. A system, comprising:

a display device, comprising:

a bezel, the bezel including a bezel light sensor; and a screen set within the bezel;

a controller coupled to the bezel light sensor, the controller configured to:

receive a flashing light signal via the bezel light sensor, the flashing light signal comprising a set of coded information;

generate a response to the set of coded information; and provide the response to the set of coded information via the screen;

an electronic device, comprising:

an imaging device configured to acquire one or more images;

a light generator configured to generate the flashing light signal, the flashing light signal comprising a wavelength; and a user controller configured to:

transmit the set of coded information via the flashing light signal generated by the light generator; and acquire the response to the set of coded information from the screen via the imaging device; and a filter couplable to at least one of the electronic device at a position proximate to the light generator or the display device at a position proximate to the bezel light sensor, the wavelength of the flashing light signal being a first wavelength, the filter configured to convert the first wavelength to a second wavelength.

20. The system in claim 19, the display device being installed within an avionics environment, the controller being installed within the avionics environment, the set of coded information selected for at least one of troubleshooting or updating one or more components of an avionics system installed within the avionics environment, the avionics system being in communication with the controller.

* * * * *